(12) United States Patent
Fredenburg et al.

(10) Patent No.: US 12,250,903 B2
(45) Date of Patent: Mar. 18, 2025

(54) GROUNDS MAINTENANCE VEHICLE

(71) Applicant: EXMARK MANUFACTURING COMPANY INCORPORATED, Beatrice, NE (US)

(72) Inventors: Michael Shane Fredenburg, Hickman, NE (US); Valerie Jinright, Beatrice, NE (US)

(73) Assignee: EXMARK MANUFACTURING COMPANY INCORPORATED, Beatrice, NE (US)

( * ) Notice: Subject to any disclaimer, the term of this patent is extended or adjusted under 35 U.S.C. 154(b) by 320 days.

(21) Appl. No.: 17/682,147

(22) Filed: Feb. 28, 2022

(65) Prior Publication Data

US 2023/0270046 A1    Aug. 31, 2023

(51) Int. Cl.
*A01D 34/74*    (2006.01)
*A01D 34/66*    (2006.01)
*A01D 101/00*    (2006.01)

(52) U.S. Cl.
CPC ............. *A01D 34/74* (2013.01); *A01D 34/66* (2013.01); *A01D 2101/00* (2013.01)

(58) Field of Classification Search
CPC ..... A01D 34/74; A01D 34/66; A01D 2101/00
See application file for complete search history.

(56) References Cited

U.S. PATENT DOCUMENTS

| | | | | |
|---|---|---|---|---|
| 295,190 A * | 3/1884 | Miles | ................ | G05G 5/18 74/536 |
| 557,549 A * | 4/1896 | Burkett | ................ | G05G 5/18 74/536 |
| 618,297 A * | 1/1899 | Shaw | ................ | B66C 5/025 254/374 |
| 664,804 A * | 12/1900 | Young | ................ | G05G 5/18 74/536 |
| 905,896 A * | 12/1908 | Lyon et al. | ............. | F16D 49/16 188/30 |
| 1,013,174 A * | 1/1912 | Jones | ................ | B25B 13/463 81/61 |

(Continued)

FOREIGN PATENT DOCUMENTS

FR    2374835 A  *  8/1978   ........... A01B 59/044

*Primary Examiner* — James A Shriver, II
*Assistant Examiner* — Michael T. Walsh
(74) *Attorney, Agent, or Firm* — Mueting Raasch Group

(57) ABSTRACT

A grounds maintenance vehicle has a vehicle frame, an implement coupled to the vehicle frame, and a height selection tool configured to change a vertical position of the implement relative to the vehicle frame. The height selection tool has a manually engageable mechanism pivotably coupled to the vehicle frame. Pivoting the manually engageable mechanism relative to the vehicle frame changes the vertical position of the implement relative to the vehicle frame. A locking rail is coupled to the frame, extends adjacently to the pivot pathway, and defines a plurality of latch openings along the pivot pathway. A pawl pivotably coupled to the manually engageable mechanism has a latching end configured pivot into each latch opening to selectively fix the manually engageable mechanism to the locking rail at each of a plurality of incremental locations along the pivot pathway. Each incremental location corresponds to a particular latch opening and defines an operating height of the implement.

21 Claims, 15 Drawing Sheets

(56) References Cited

U.S. PATENT DOCUMENTS

| | | | | | |
|---|---|---|---|---|---|
| 1,294,783 | A | * | 2/1919 | Fekete | G05G 5/18 |
| | | | | | 74/537 |
| 1,437,874 | A | * | 12/1922 | Townsend | A01D 75/306 |
| | | | | | 56/7 |
| 1,609,719 | A | * | 12/1926 | Hughes | G05G 5/18 |
| | | | | | 74/537 |
| 2,155,062 | A | * | 4/1939 | Sandberg | G05G 7/02 |
| | | | | | 74/530 |
| 4,577,455 | A | * | 3/1986 | Amano | A01D 34/74 |
| | | | | | 56/255 |
| 6,494,028 | B2 | * | 12/2002 | Moore | A01D 34/74 |
| | | | | | 56/15.8 |
| 7,448,191 | B2 | * | 11/2008 | Elhardt | A01D 34/74 |
| | | | | | 56/17.1 |
| 8,919,087 | B2 | * | 12/2014 | Lancaster | A01D 34/74 |
| | | | | | 56/15.8 |
| 9,516,809 | B2 | * | 12/2016 | Wright | A01D 34/74 |
| 11,310,961 | B2 | * | 4/2022 | Clontz | A01D 34/661 |
| 2002/0194826 | A1 | * | 12/2002 | Schick | A01D 34/662 |
| | | | | | 56/15.9 |
| 2014/0083069 | A1 | * | 3/2014 | Berglund | A01D 34/64 |
| | | | | | 56/14.7 |

* cited by examiner

GROUNDS MAINTENANCE VEHICLE

TECHNOLOGICAL FIELD

The present disclosure is generally related to a vehicle. More particularly, the present disclosure is related to a grounds maintenance vehicle.

BACKGROUND

Grounds maintenance vehicles such as lawn mowers, aerators, and spreader/sprayers are commonly used by homeowners and professionals alike. These vehicles are typically configured as walk-behind or ride-on vehicles having an attached implement (such as a grass cutting deck), where the implement is secured to a frame of the grounds maintenance vehicle. The height of the implement is generally adjustable relative to the vehicle frame and the ground. Some designs provide for manual adjustment of the height of the implement relative to the vehicle frame such as by a manually-adjustable position fastener associated with the implement that abuts the frame to set the desired height. The implement's weight exerts a force on the position fastener to, at least in part, secure the connection. Furthermore, such vehicles may incorporate a transport lock system that locks the position of the implement to the vehicle frame for transport of the vehicle. The implement can be locked in a position vertically above the maximum operating height of the implement to safeguard clearance between the implement and the ground surface during transport.

SUMMARY

Some embodiments of the technology disclosed herein relate to a grounds maintenance vehicle. The vehicle has a vehicle frame and an implement coupled to the vehicle frame. A height selection tool is configured to change a vertical position of the implement relative to the vehicle frame. The height selection tool has a manually engageable mechanism pivotably coupled to the vehicle frame, where pivoting of the manually engageable mechanism relative to the vehicle frame changes the vertical position of the implement relative to the vehicle frame. The manually engageable mechanism defines a pivot pathway. A locking rail is coupled to the vehicle frame and extends adjacently to the pivot pathway. The locking rail defines a plurality of latch openings along the pivot pathway. A pawl pivotably coupled to the manually engageable mechanism has a latching end configured to pivot into each latch opening to selectively fix the manually engageable mechanism to the locking rail at each of a plurality of incremental locations along the pivot pathway. Each incremental location corresponds to a particular latch opening and defines an operating height of the implement.

In some such embodiments, each of the plurality of latch openings is a notch extending radially inward. Additionally or alternatively, each of the plurality of latch openings has a profile that is asymmetrical. Additionally or alternatively, each of the plurality of latch openings each having a leading face having a first profile and a trailing face having a second profile, where the first profile and the second profile are different shapes. Additionally or alternatively, a pawl release is configured to selectively pivot the latching end of the pawl out of each latch opening, where a manually engageable control is coupled to the manually engageable mechanism in operative communication with the pawl release. Additionally or alternatively, a transport lock is configured to fix the manually engageable mechanism to the locking rail to define a transport height between the implement and a horizontal ground surface, where the transport height is greater than each operating height of the implement.

Additionally or alternatively, the transport lock includes the pawl and a first latch opening of the plurality of latch openings. Additionally or alternatively, the transport lock has a latch configured to releasably fix the manually engageable mechanism relative to the locking rail. Additionally or alternatively, the latch is pivotably coupled to the locking rail and defines a mechanism engagement surface, and the manually engageable mechanism defines a latch engagement surface that is configured to be engaged by the mechanism engagement surface of the latch. Additionally or alternatively, a latch release is configured to push the latch out of engagement with the latch engagement surface. Additionally or alternatively, the manually engageable mechanism and the locking rail directly contact the latching end of the pawl such that a load is transmitted from the manually engageable mechanism to the locking rail through the latching end of the pawl.

Some embodiments of the technology disclosed herein relate to a grounds maintenance vehicle having a vehicle frame, an implement coupled to the vehicle frame, and a height selection tool configured to change a vertical position of the implement relative to the vehicle frame. The height selection tool has a manually engageable mechanism pivotably coupled to the vehicle frame, where pivoting the manually engageable mechanism relative to the vehicle frame changes the vertical position of the implement relative to the vehicle frame. The manually engageable mechanism defines a pivot pathway. A locking rail coupled to the vehicle frame defines a plurality of latch openings along the pivot pathway. A first locking mechanism has a pawl pivotably coupled to the manually engageable mechanism. The pawl has a latching end configured to pivot into each latch opening to selectively fix the manually engageable mechanism to the locking rail. The first locking mechanism is configured to obstruct pivoting of the manually engageable mechanism in a first direction and a second direction at each of a plurality of incremental locations, where each incremental location corresponds to a particular latch opening. Each incremental location defines a particular operating height of the implement from a horizontal ground surface. A second locking mechanism is configured to be engaged to selectively obstruct pivoting of the manually engageable mechanism relative to the locking rail at each of a plurality of height settings. The second locking mechanism is configured to obstruct pivoting of the manually engageable mechanism in a first direction and allow pivoting of the manually engageable mechanism in a second direction opposite the first direction.

In some such embodiments, a transport lock is configured to fix the manually engageable mechanism relative to the locking rail to define a transport height between the implement and the horizontal ground surface, where the transport height is greater than each operating height of the implement. Additionally or alternatively, each of the plurality of latch openings is a notch extending radially inward. Additionally or alternatively, each of the latch openings has a profile that is asymmetrical. Additionally or alternatively, each of the plurality of latch openings have a leading face having a first profile and a trailing face having a second profile, where the first profile and the second profile are different shapes. Additionally or alternatively, a pawl release is configured to selectively pivot the latching end of the pawl out of each latch opening, where a manually engageable control is coupled to the manually engageable mechanism in operative communication with the pawl release. Additionally or alternatively, the transport lock has a latch configured to releasably fix the manually engageable mechanism relative to the locking rail. Additionally or alternatively, the latch is pivotably coupled to the locking rail and defines a mechanism engagement surface, and the manually engageable mechanism defines a latch engagement surface that is configured to be engaged by the mechanism engagement surface of the latch. Additionally or alternatively, a latch release is configured to push the latch out of engagement with the latch engagement surface. Additionally or alternatively, the second locking mechanism is configured to be selectively disengaged and upon disengagement, the manually engageable mechanism and the locking rail directly contact the latching end of the pawl such that a load is transmitted from the manually engageable mechanism to the locking rail through the latching end of the pawl. Additionally or alternatively, the second locking mechanism is engaged, a clearance is defined between the latching end of the pawl and the latch opening.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE DRAWINGS

The present technology may be more completely understood and appreciated in consideration of the following detailed description of various embodiments in connection with the accompanying drawings.

Figure 1:
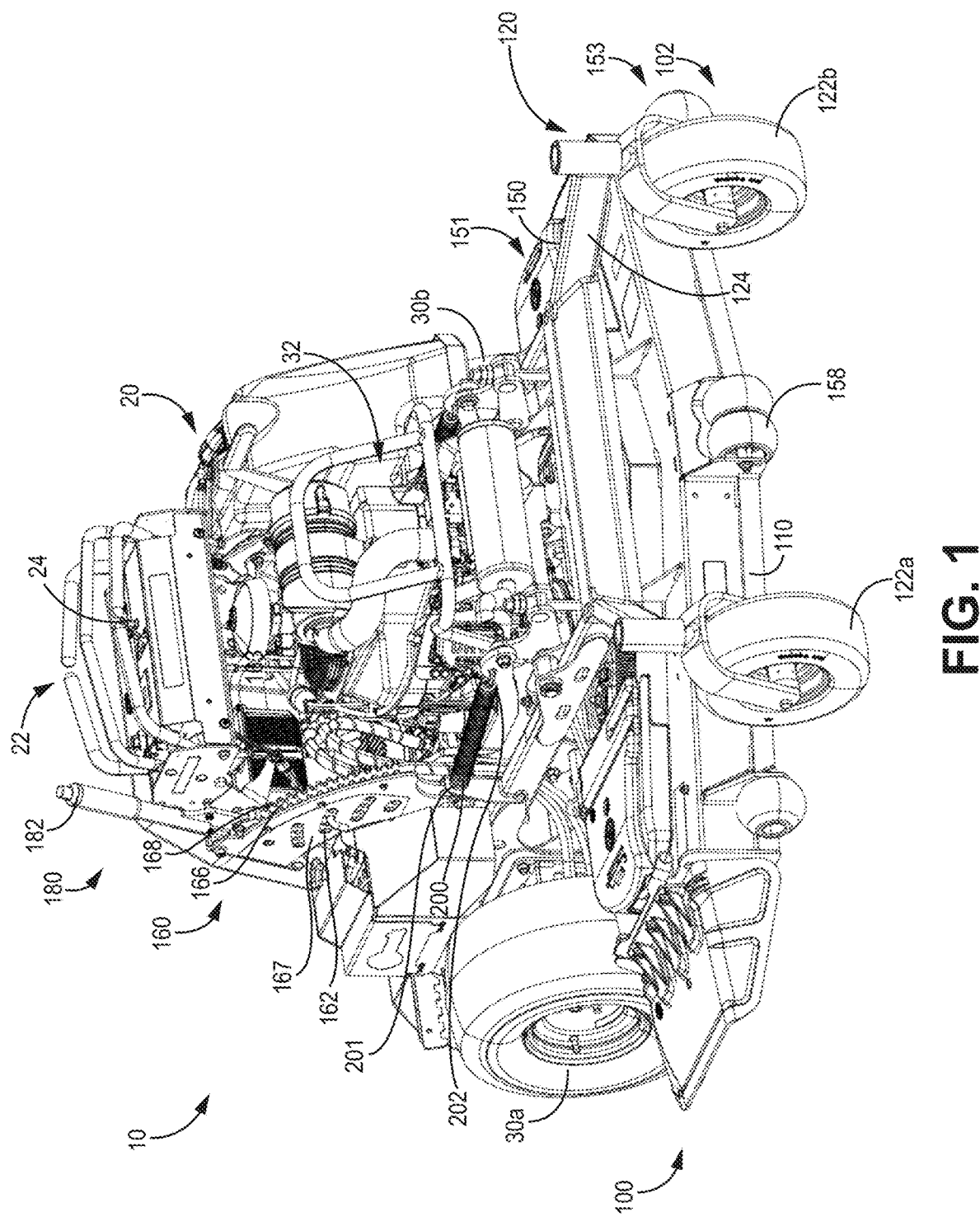
FIG. 1 is a perspective view of an example vehicle consistent with embodiments.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

In the following detailed description of illustrative embodiments, reference is made to the accompanying figures of the drawing which form a part hereof. It is to be understood that other embodiments, which may not be described and/or illustrated herein, are certainly contemplated.

All headings and subheadings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about."

It is also noted that the term "comprises" (and variations thereof) does not have a limiting meaning where this term appears in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure, or from the perspective of one operating the vehicle while it is in an operating configuration. The numerical descriptors such as "first," "second," and "third" are used herein to distinguish components having similar names and should not be interpreted as limiting the location or function of the particular component referenced. Each term is used only to simplify the description and is not meant to limit the interpretation of any embodiment described.

The suffixes "a" and "b" may be used with element numbers throughout this description to denote various left- and right-side parts/features, respectively. The parts/features denoted with "a" and "b" suffixes can be substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature and may correspond to a reference numeral on a drawing that is accompanied by a letter suffix.

Figure 2:
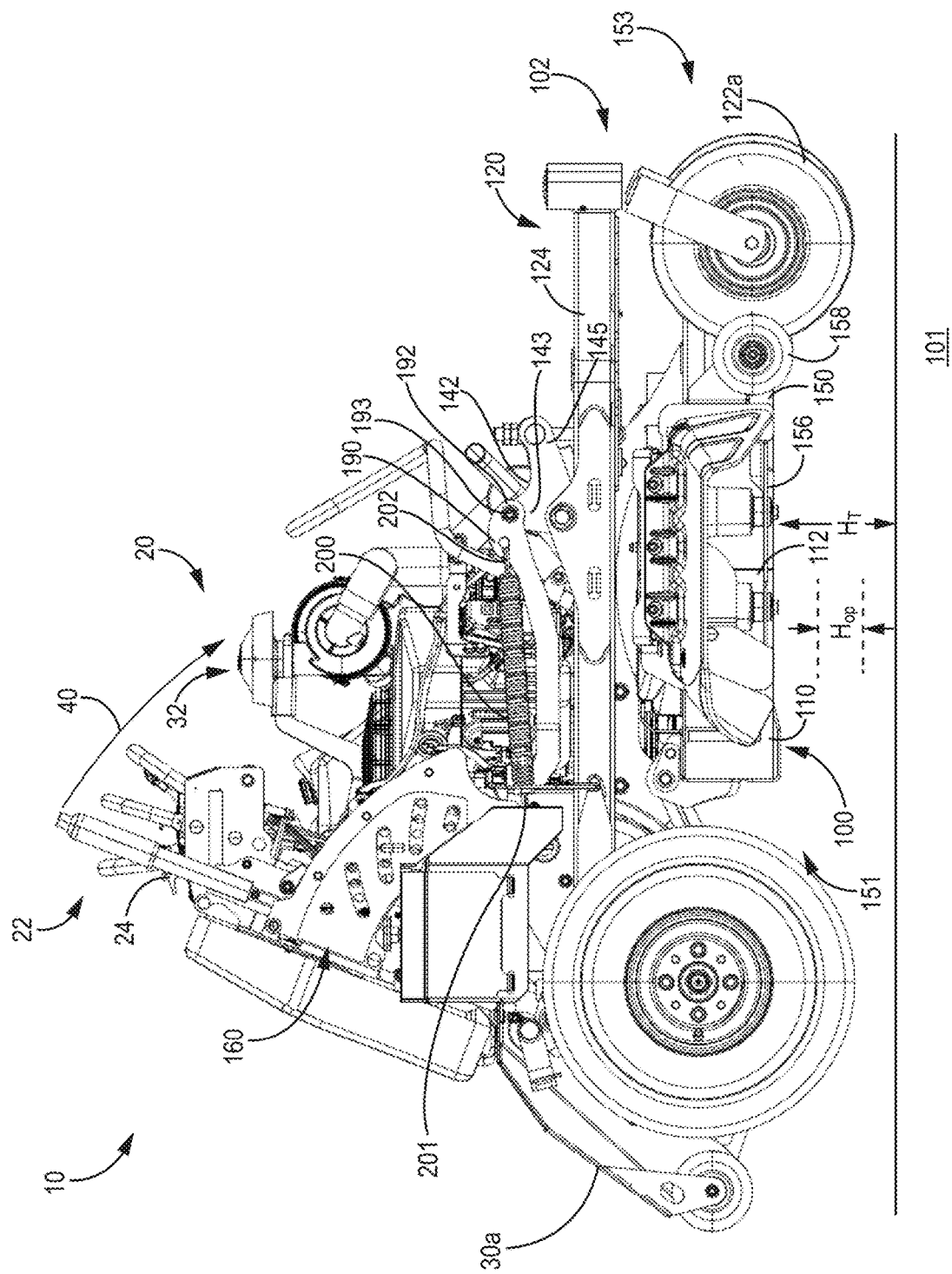
FIG. 2 is first side view of the example vehicle of FIG. 1.

With reference to the figures, where like reference numerals designate like parts and assemblies throughout the several views, FIG. 1 illustrates a perspective view of an example grounds maintenance vehicle 10 in accordance with the present disclosure, which can simply be referred to as a "vehicle". FIG. 2 depicts a first side view of the example vehicle 10 of FIG. 1. The vehicle 10, in the current example, is a standing lawn mower. While embodiments are described herein with respect to such a mower, this disclosure is equally applicable to mowers having alternate configurations (e.g., walk-behind mowers and riding mowers). The embodiments also apply to other types of grounds maintenance vehicles (e.g., aerators, dethatchers, debris management systems, blowers, vacuums, sweepers, general purpose utility vehicles, etc.) without limitation.

The vehicle 10 has a first portion that is an implement assembly 100 and a second portion that is a drive assembly 20. A vehicle frame assembly 120 is generally configured to support the drive assembly 20, the implement assembly 100, and other components of the vehicle 10.

The vehicle frame assembly 120 has a vehicle frame 124. A first ground engaging member 122a and a second ground engaging member 122b are disposed between the vehicle frame 124 and the ground surface 101 (FIG. 2). The ground engaging members 122a, 122b are generally configured to accommodate translation of the vehicle frame 124 across the ground surface 101. In the current example, the ground engaging members 122a, 122b are wheels that are rotatably coupled to the vehicle frame 124. More particularly, the ground engaging members 122a, 122b are caster wheels that rotate (for rolling) and swivel (for turning) and are coupled to a front end 102 of the vehicle frame 124. In some embodiments, the ground engaging members can be alternate structures or components other than caster wheels such as tracks, rollers, or drive wheels.

The drive assembly 20 is supported by the vehicle frame assembly 120. The drive assembly 20 is generally configured to propel the vehicle 10 for use. The drive assembly 20 of the grounds-maintenance vehicle 10 can have drive wheels 30a, 30b and a prime mover 32 (e.g., internal combustion engine or electric motor) that are configured to selectively propel the vehicle 10 across the ground surface 101. The drive assembly 20 can have handles 22 by which the vehicle 10 is directed and controlled by an operator. The drive assembly 20 can also have various controls 24 that can be manipulated by the operator to adjust various operating conditions.

The implement assembly 100 is generally configured to couple to, or be integrally formed with, a grounds maintenance vehicle. The implement assembly 100 is generally configured to perform a maintenance task on a surface, such as the ground surface 101. The implement assembly 100 has an implement 150 having a first implement end 151 and a second implement end 153 and is generally configured for operational interaction with the ground surface 101. In this example, the first implement end 151 is the back end of the implement 150 and the second implement end 153 is the front end of the implement 150. In the current example, the implement 150 is configured to be disposed between at least a portion of the vehicle frame assembly 120 and the ground surface 101.

In the current example, where the vehicle 10 has an implement assembly 100 that is a lawn mower assembly, the implement 150 is a cutting deck having a housing 110 defining a cutting chamber 112 (FIG. 2). Cutting blades 156 are rotatably disposed in the cutting chamber 112. As stated above, other cutting decks (e.g., belly-mounted decks, towed decks, reel units, etc.), as well as other implements, are contemplated within the scope of this disclosure. During operation, power is selectively delivered to the cutting blades 156 by the engine, whereby the blades 156 rotate at a speed sufficient to sever grass and other vegetation over which the deck passes.

The implement 150 can have a plurality of rollers 158 (e.g., anti-scalp rollers) configured to be disposed between the implement 150 and a ground surface 101 to limit contact between the implement 150 and the ground surface 101. The plurality of rollers 158 can be configured to obstruct contact between the implement 150 and the ground surface 101 to reduce scalping of the ground surface 101 as the implement 150 translates across the ground surface 101.

A pre-selected operating height $H_{op}$ is defined between the implement 150 and the ground surface 101 for a specific height-of-cut setting. FIG. 2 depicts the implement 150 at a transport height $H_T$ consistent with an engaged transport lock system, which will be described in more detail below. However, FIG. 2 also depicts an example range of operating heights $H_{op}$ between the implement 150 and the ground surface 101. The operating height $H_{op}$ can be selected by a user through a height selection tool 160. The height selection tool 160 is generally configured to change a vertical position of the implement 150 relative to the vehicle frame 124. The height selection tool 160 can change the pre-selected operating height $H_{op}$ of the implement relative to the ground surface 101. An example specific configuration of the height selection tool will be described in more detail below with reference to FIG. 3.

It is noted that, during operation, the actual operating height of the implement 150 relative to the ground surface 101 can vary from the pre-selected operating height $H_{op}$. For example, the actual operating height of the implement 150 can be less than the pre-selected operating height $H_{op}$ at locations where a portion of the ground surface 101 under the implement 150 has a height that exceeds the height of the portion of the ground surface 101 under the ground engaging members 122 of the vehicle frame assembly 120 (e.g. as is common with undulating turf). Similarly, the actual operating height of the implement 150 relative to the ground surface 101 can be greater than the pre-selected operating height $H_{op}$ at locations where a portion of the ground surface 101 under the implement 150 dips below the height of the portion of the ground surface 101 under the ground engaging members 122 and drive wheels 30 of the vehicle frame assembly 120. Also, it is noted that, in some implementations, portions of the implement 150 may translate vertically upward towards the vehicle frame assembly 120 (which decreases the distance between the implement 150 and the vehicle frame assembly 120) to accommodate an uneven ground surface 101 such as where an undulation pushes the implement 150 upward. As such, for purposes of the present disclosure, the pre-selected operating height $H_{op}$ of the implement 150 relative to the ground surface 101 is the distance between the cutting blade and a horizontal ground surface 101 when the vehicle 10 is entirely positioned on the horizontal ground surface 101.

Figure 3:
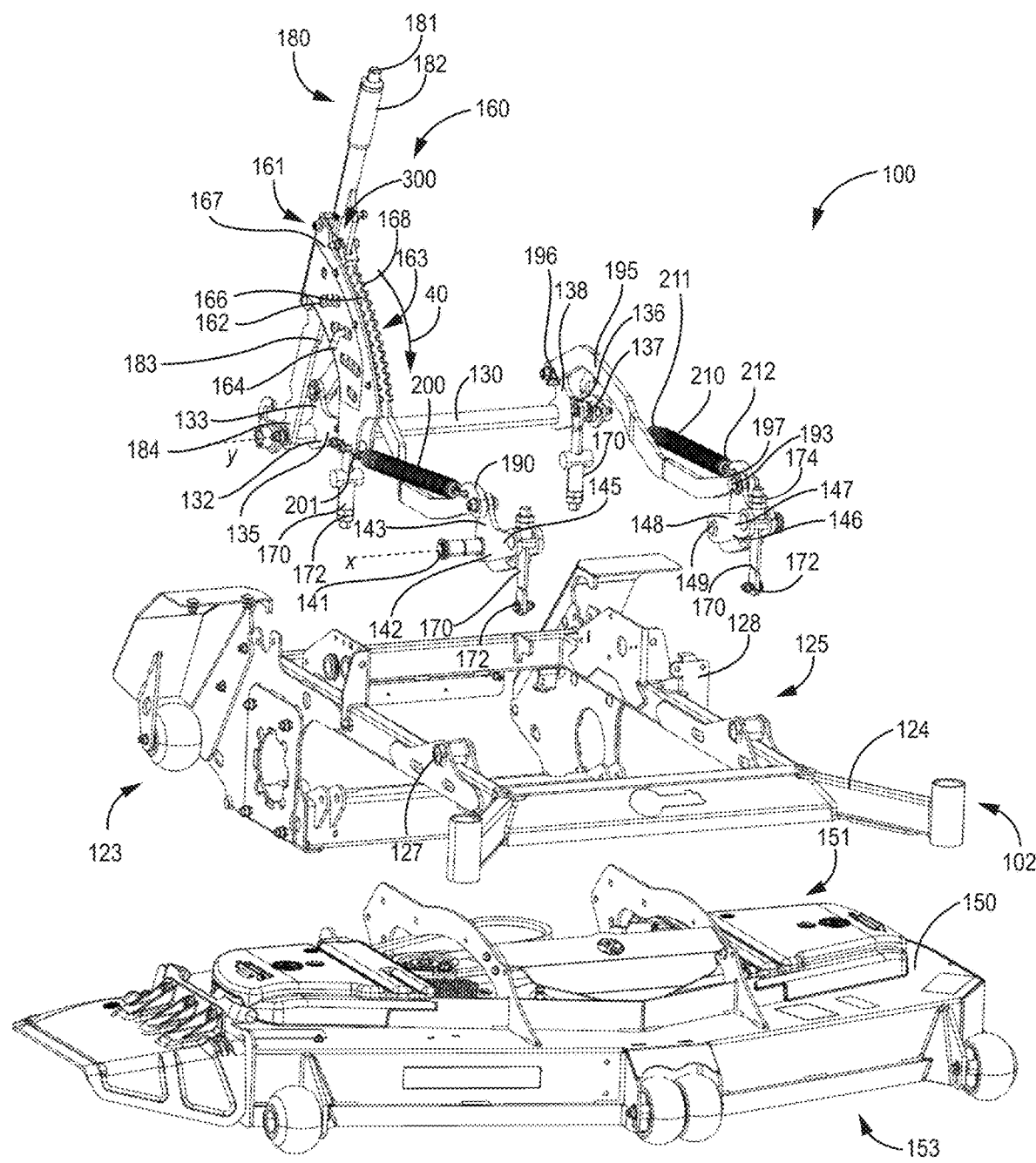
FIG. 3 is an exploded perspective view of an example vehicle consistent with embodiments.
Figure 4:
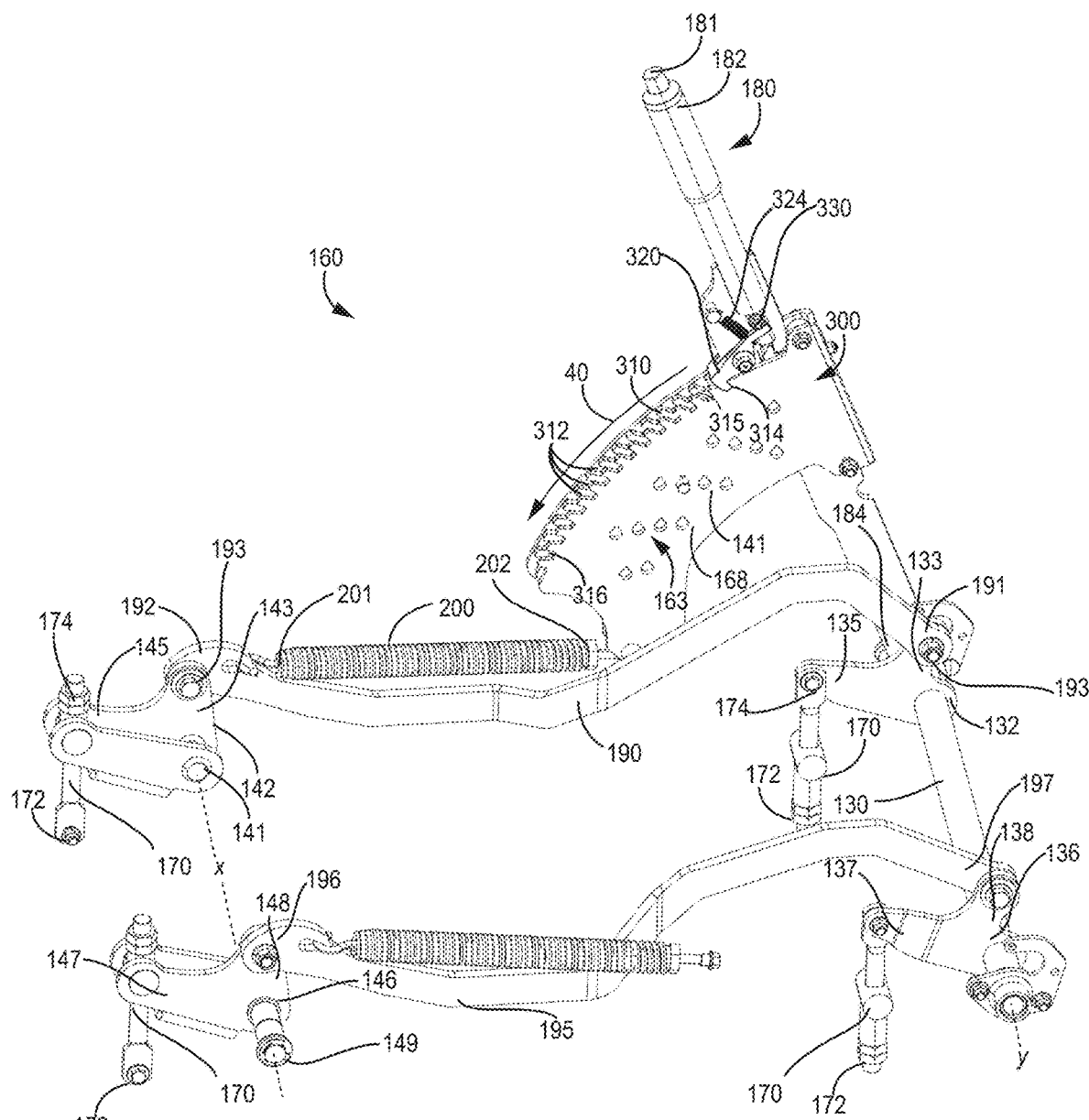
FIG. 4 is a second side perspective view of a height selection tool consistent with some embodiments.

FIG. 3 an exploded first side perspective view of an example implement assembly 100, such as the example implement assembly 100 of the vehicle 10 depicted in FIGS. 1 and 2. The implement assembly 100 includes the vehicle frame 124, the implement 150, and a height selection tool 160. FIG. 4 is a second side perspective view of the height selection tool 160 of FIG. 3.

The implement 150 is generally coupled to the vehicle frame 124 via the height selection tool 160. The height selection tool 160 is configured to change and set the vertical position of the implement 150 relative to the vehicle frame 124, as described above. In various embodiments, the implement 150 is coupled to the vehicle frame 124 via the height selection tool 160. The height selection tool 160 generally has a first shaft 130, a first bell crank 132, a second bell crank 142, a first rigid linkage 190, and a first implement spring 200.

The first shaft 130 is pivotably coupled to the vehicle frame 124. The first shaft 130 is generally configured to pivot relative to the vehicle frame 124 and is part of a mechanical communication chain that changes the vertical position of the implement 150 relative to the vehicle frame 124. The first shaft 130 extends from a first side 123 of the vehicle frame 124 to a second side 125 of the vehicle frame 124. The first shaft 130 is coupled to the implement 150 towards the first implement end 151. More specifically, the first shaft 130 is coupled to the implement 150 via the first bell crank 132.

The first bell crank 132 and a second bell crank 142 are generally configured to change the vertical position of at least a portion of the implement 150 relative to the vehicle frame 124 in response to pivoting of the first shaft 130. The first bell crank 132 is rigidly coupled to the first shaft 130. As such, pivoting of the first shaft 130 results in equal pivoting of the first bell crank 132. The second bell crank 142 is pivotably coupled to the vehicle frame 124 and is pivotable about a rotational axis x (FIG. 3), which is referred to as the "first" rotational axis herein. In particular, the second bell crank 142 is rigidly coupled to a second shaft 141 that is pivotably coupled to the vehicle frame 124. The second shaft 141 shares the first rotational axis x with the second bell crank 142. More particularly, the second shaft 141 is rotatably disposed in a shaft opening 127 defined by the vehicle frame 124. Bearings can be positioned in the shaft opening 127 between the second shaft 141 and the vehicle frame 124. In some alternate embodiments, the second bell crank 142 can be rotatably disposed on a shaft that is rigidly fixed to the vehicle frame 124. In some such examples, bearings can be positioned between the shaft and the second bell crank 142.

Figure 12:
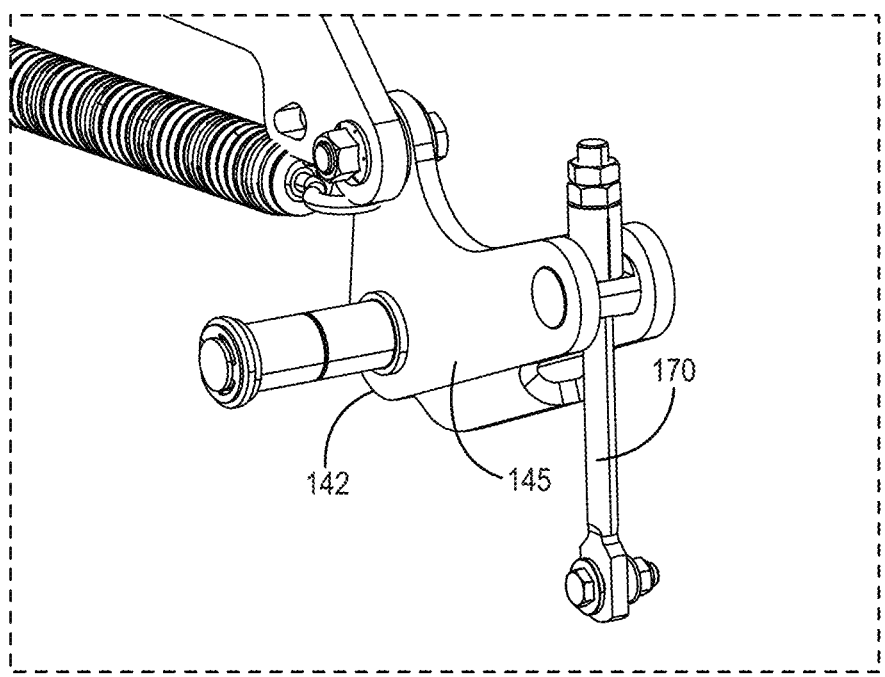
FIG. 12 is a detail view of FIG. 3.

The first bell crank 132 has a first implement arm 135 extending radially outward from the first shaft 130. The second bell crank 142 has a second implement arm 145 extending radially outward from the first rotational axis x. The implement 150 is coupled to the first implement arm 135 and the second implement arm 145. The first (e.g., back) implement end 151 of the implement 150 is coupled to the first implement arm 135 and the second (e.g., front) implement end 153 is coupled to the second implement arm 145 via coupling structures 170. The coupling structures 170 are pivotably coupled to each of the first implement arm 135, the second implement arm 145 and the implement 150. In particular, a first end 172 of each coupling structure 170 is coupled to the implement 150. Towards a second end 174, the coupling structure 170 is pivotably coupled to the first implement arm 135. In the current example, each coupling structure 170 is a trunnion that is pivotably disposed between a pair of bars forming each implement arm 135, 145, which is more clearly visible in the detail view of the second bell crank 142 depicted in FIG. 12. In other embodiments, the coupling structures can be different components such as rods coupled with metal links, chains, cables, plates with slots, or other linkages that allows the implement to hang via gravity from the vehicle frame assembly 120.

The first bell crank 132 is configured to transmit rotational motion from the first shaft 130 to the second bell crank 142. In particular, a first rigid linkage 190 couples first bell crank 132 to the second bell crank 142. The first linkage 190 is generally configured to translate rotational motion of the first shaft 130 such that the first bell crank 132 and the second bell crank 142 rotate in unison. In particular, the first bell crank 132 has a first linkage arm 133 extending radially outward from the first shaft 130. The first linkage arm 133 and the first implement arm 135 extend in different radial directions from the first shaft 130. The second bell crank 142 has a second linkage arm 143 extending radially outward from the first rotational axis x. The second linkage arm 143 and the second implement arm 145 extend in different radial directions relative to the first rotational axis x. The first linkage 190 has a first end 191 that is pivotably coupled to the first linkage arm 133 and a second end 192 that is pivotably coupled to the second linkage arm 143. As such, if the first shaft 130 is rotated, that rotation is mechanically translated to the first bell crank 132 and the second bell crank 142. The locations at which the first linkage 190 and the first and second bell cranks 132, 142 are coupled are referred to as joints 193 (visible in FIG. 4). The joints 193 can be defined by a bolt, for example.

As is visible in FIGS. 3 and 4, in the current embodiment the height selection tool 160 has a third bell crank 136 and a fourth bell crank 146 that are configured similarly to the first bell crank 132 and the second bell crank 142, respectively. The third bell crank 136 and the fourth bell crank 146 are also configured to change the vertical position of at least a portion of the implement 150 relative to the vehicle frame 124 in response to pivoting of the first shaft 130. The third bell crank 136 is rigidly coupled to the first shaft 130. As such, pivoting of the first shaft 130 results in equal pivoting of the third bell crank 136. The fourth bell crank 146 is pivotably coupled to the vehicle frame 124 and is pivotable about the first rotational axis x. In particular, the fourth bell crank 146 is rigidly coupled to a third shaft 149 that is pivotably coupled to the vehicle frame 124. The third shaft 149 can be configured to rotate about the first rotational axis x. More particularly, the third shaft 149 is rotatably disposed in a third shaft opening 128 defined by the vehicle frame 124. The fourth bell crank 146 can be coupled to the vehicle frame 124 through other approaches similar to those discussed with reference to the second bell crank 142. Further, in some embodiments the second bell crank 142 and the fourth bell crank 146 can be coupled to the vehicle frame 124 via a single separate shaft, where each of the second bell crank 142 and the fourth bell crank 146 are rotatably disposed on the single separate shaft. In such an implementation the single separate shaft can be fixed to the vehicle frame 124.

The third bell crank 136 has a third implement arm 137 extending radially outward from the first shaft 130 and the fourth bell crank 146 has a fourth implement arm 147 extending radially outward from the first rotational axis x. The implement 150 is also coupled to the third implement arm 137 and the fourth implement arm 147. The first (e.g., back) implement end 151 of the implement 150 is coupled to the third implement arm 137 and the second (e.g., front) implement end 153 is coupled to the fourth implement arm 147 via coupling structures 170. The coupling structures 170 are consistent with those described above with respect to the first and second bell cranks 132, 142.

In various embodiments, the third bell crank 136 is also configured to transmit rotational motion from the first shaft 130 to the fourth bell crank 146. In particular, a second rigid linkage 195 couples third bell crank 136 to the fourth bell crank 146 that, similar to the first linkage 190, is configured to translate rotational motion such that the third bell crank 136 and the fourth bell crank 146 rotate in unison. In particular, the third bell crank 136 has a third linkage arm 138 extending radially outward from the third shaft 149. The third linkage arm 138 and the third implement arm 137 extend in different radial directions from the first shaft 130. The fourth bell crank 146 has a fourth linkage arm 148 extending radially outward from a rotational axis, which can be colinear with the first rotational axis x. The fourth linkage arm 148 and the fourth implement arm 147 extend in different radial directions relative to the first rotational axis x. The second linkage 195 has a first end 196 that is pivotably coupled to the third linkage arm 138 and a second end 197 that is pivotably coupled to the fourth linkage arm 148. As such, if the first shaft 130 is rotated, that rotation is mechanically translated to the third bell crank 136 and the fourth bell crank 146.

In various embodiments, the first implement arm 135, the second implement arm 145, the third implement arm 137, and the fourth implement arm 147 are parallel. In various embodiments, the first linkage arm 133, the second linkage arm 143, the third linkage arm 138, and the fourth linkage arm 148 are parallel.

In various embodiments, the implement 150 hangs from the first end 172 of each of the coupling structures 170 under the force of gravity. The weight of the implement 150 applies a rotational force on the implement arms 135, 145, 137, 147 of the respective bell cranks 132, 142, 136, 146 and on the first shaft 130. To maintain the implement at a particular operating height, the height selection tool 160 is configured to oppose the rotational force exerted on the first shaft 130 by the weight of the implement 150 to maintain the vertical position of the implement 150 relative to the ground surface 101 and the vehicle frame 124, which will be described in more detail herein.

A manually engageable mechanism 180 is generally configured to change the vertical position of the implement 150. In various embodiments, the manually engageable mechanism 180 is pivotably coupled to the vehicle frame 124. The manually engageable mechanism 180 defines a pivot pathway 40 that defines the pivot range of the manually engageable mechanism 180 relative to the vehicle frame 124. Pivoting of the manually engageable mechanism 180 relative to the vehicle frame 124 changes the vertical position of the implement 150 relative to the vehicle frame 124. In various embodiments, the manually engageable mechanism 180 is fixed to the first shaft 130. In the current example the manually engageable mechanism 180 is configured as a lever. The manually engageable mechanism 180 is configured to pivot the first shaft 130 in response to manual manipulation of the manually engageable mechanism 180 by a user. The manually engageable mechanism 180 has an engagement end 182 configured for engaging (e.g., grasping, depressing, and/or lifting) by a user and a coupling end 184 (visible in FIGS. 3 and 4) fixed to the first shaft 130 adjacent the first bell crank 132. In the current example, the engagement end 182 is a handle configured for grasping by a user's hand. In some embodiments the manually engageable mechanism can be fixed to a second shaft. In some embodiments the manually engageable mechanism can be fixed to the first linkage 190. In some embodiments the manually engageable mechanism is a foot operated lever, where the engagement end of the manually engageable mechanism is configured to receive the foot of a user.

In the example of FIG. 1, the engagement end 182 is proximate handles 22 and controls 24, where a user's hands are positioned when a user is operating the vehicle 10. In embodiments where the engagement end is configured to receive the foot of a user, the engagement end is positioned proximate the intended location of a user's foot when the user is operating the vehicle.

The manually engageable mechanism 180 is configured to pivot the first shaft 130, the first bell crank 132 and the second bell crank 142 in unison via the first linkage 190, but other configurations are certainly possible to achieve such functionality. In some alternate embodiments the first shaft 130 and the second bell crank 142 can be in mechanical rotating communication via gears. As mentioned above, the manually engageable mechanism 180 can be fixed to the first linkage 190 in some embodiments or directly coupled to the second shaft 141 in other embodiments.

To change the vertical position of the implement 150 in a system such as FIG. 2, a user can grasp the engagement end 182 of the manually engageable mechanism 180 and pivot the manually engageable mechanism 180 counterclockwise relative to FIG. 4, which rotates the first shaft 130 and, therefore, the bell cranks, counterclockwise in unison. The counterclockwise rotation of the first shaft 130 pivots each of the second ends 174 of the coupling structures 170 downwards in unison, which lowers the implement 150 to a particular vertical position. One or more locking mechanism 161, 300 can be selectively engaged to define each of a plurality of discrete operating heights $H_{op}$ (depicted for example in FIG. 2) between the implement 150 and the ground surface 101, which corresponds to a vertical position of the implement 150 relative to the vehicle frame 124. Example locking mechanisms 161, 300 will now be described.

Figure 5:
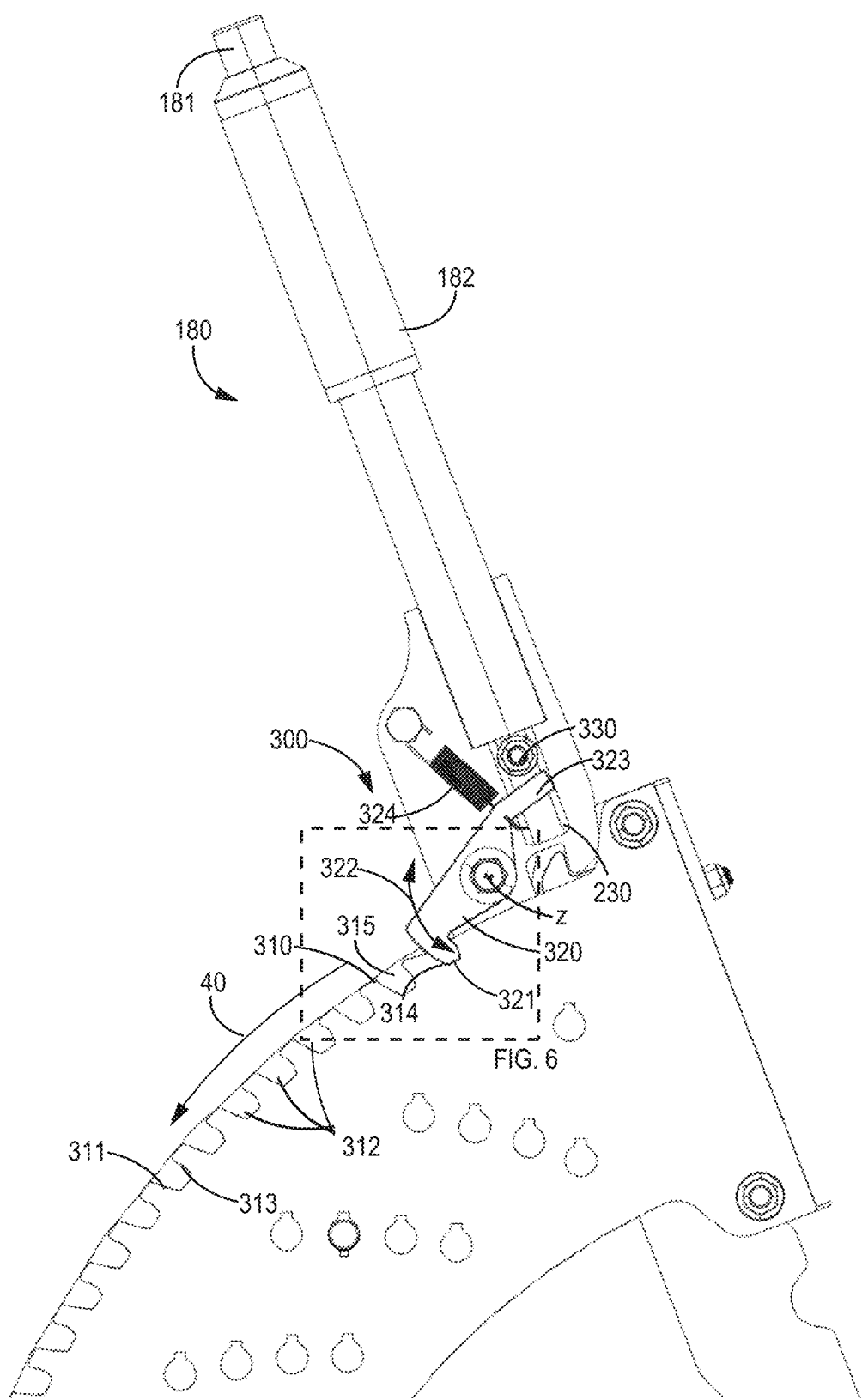
FIG. 5 is detail side view of FIG. 4.

A first locking mechanism 300 is generally visible in FIG. 4 and FIG. 5, where FIG. 5 is a detail side view of the first locking mechanism 300. The first locking mechanism 300 can be a component of the height selection tool 160. The first locking mechanism 300 is generally configured to obstruct pivoting of the manually engageable mechanism 180 in a first direction and a second direction opposite the first direction, such as the clockwise and counterclockwise directions, at each of a plurality of incremental locations along the pivot pathway 40. Each of the plurality of incremental locations defines a particular operating height of the implement. The first locking mechanism 300 may advantageously select the operating height of the implement relative to the frame and a horizontal ground surface. The first locking mechanism 300 may also advantageously maintain the manually engageable mechanism 180 in a set position during vehicle operation despite environmental conditions that may displace the implement in the vertical direction. For example, an undulation of a ground surface that pushes the implement vertically upwards during operation would not result in pivoting of the manually engageable mechanism 180 when the first locking mechanism 300 is engaged. In various embodiments, the first locking mechanism 300 is configured to obstruct pivoting of the first shaft 130 and each of the bell cranks 132, 136, 142, 146.

The first locking mechanism 300 has a locking rail 310 that is coupled to the vehicle frame 124. The locking rail 310 extends adjacently to the pivot pathway 40 of the manually engageable mechanism 180. In various embodiments, the first locking mechanism 300 is configured to selectively fix the manually engageable mechanism 180 and the locking rail 310. The first locking mechanism 300 generally defines a plurality of height settings 312, which are each selectable by a user. The plurality of height settings 312 can be discrete locations defined by the locking rail 310. The height settings 312 are a plurality of latch openings 312 defined by the locking rail 310. The latch openings 312 are positioned along the pivot pathway 40 such that each latch opening corresponds to an incremental location of a plurality of incremental locations along the pivot pathway 40. Each latch opening defines a discrete height setting, which defines the vertical distance between the implement 150 and the vehicle frame 124 and/or the ground surface 101.

In various examples, the first locking mechanism 300 has a pawl 320 that is pivotably coupled to the manually engageable mechanism 180. The pawl 320 is pivotable about a pawl pivot axis z. The pawl 320 defines a pawl pathway 322 (FIG. 5) about the pawl pivot axis z. The pawl 320 is configured to pivot into each latch opening of the plurality of latch openings 312 to selectively fix the manually engageable mechanism 180 to the locking rail 310. The pawl 320 is also configured to pivot out of each latch opening of the plurality of latch openings 312 to unfix the manually engageable mechanism 180 and the locking rail 310. When the manually engageable mechanism 180 and the locking rail 310 are unfixed, the manually engageable mechanism 180 can be pivoted along the pivot pathway 40 to change the vertical position of the implement 150 relative to the vehicle frame 124 and/or the ground surface 101. To select a new operating height, the pawl 320 of the first locking mechanism 300 is pivoted into another latch opening of the plurality of latch openings 312 to define (1) the limit on the distance (or the maximum distance) between the implement 150 relative to the vehicle frame 124 at that particular height setting, (2) the pre-selected operating height $H_{op}$ of the implement 150 relative to the ground surface 101, and (3) the orientation of the manually engageable mechanism 180 relative to the second axis y.

In examples consistent with the current embodiment, the first locking mechanism 300 opposes the rotational force exerted on the first shaft 130 and the manually engageable mechanism 180 by the weight of the implement 150 on the bell cranks, which retains the first shaft 130 and the manually engageable mechanism 180 in a particular orientation against gravity. The first locking mechanism 300 also opposes rotational force exerted on the first shaft 130 and the manually engageable mechanism 180 in the opposite rotational direction. Indeed, the first locking mechanism 300 is configured to fix the first shaft 130 and the manually engageable mechanism 180 in any one selected orientation among a plurality of discrete selectable orientations about the second rotational axis y (FIGS. 3-4) to define a corresponding plurality of discrete vertical positions of the implement 150 relative to the vehicle frame 124.

When disengaged from the locking rail 310, the pawl 320 is configured to translate along the locking rail 310 when the manually engageable mechanism 180 is pivoted about the second axis y. The pawl 320 has a latching end 321 that is configured to translate along the pawl pathway 322 as the pawl 320 is pivoted about the pawl pivot axis z. In the current example, each of the plurality of latch openings 312 is a notch extending radially inward from the pivot pathway 40. To set an operating height of the implement, the latching end 321 of the pawl 320 is pivoted out of engagement with the locking rail 310. While the pawl 320 is maintained in a disengaged position, the manually engageable mechanism 180 can be pivoted along the pivot pathway 40 until the pawl pathway 322 extends into a desired latch opening. The pawl 320 can then be pivoted about the pawl pivot axis z into the latch opening, which is an engaged position. In various embodiments, the pawl 320 is biased towards a latched position to maintain the latching end 321 of the pawl 320 within the latch opening 312. In the current example, a pawl spring 324 (FIGS. 4-5) is coupled to a second end 323 of the pawl 320 to bias the pawl 320 towards the latched position.

In various embodiments, a pawl release 330 is configured to selectively pivot the pawl 320 out of each latch opening 312 to a disengaged position. The pawl release 330 is configured to selectively pivot the pawl 320 against the biasing force of the pawl spring 324. In the current example, the pawl release 330 is configured to push the second end 323 of the pawl 320 and overcome the biasing force of the pawl spring 324 to pivot the latching end 321 of the pawl out of a particular latch opening 312. A manually engageable control 181 can be in operative communication with the pawl release 330. The manually engageable control 181 is in mechanical communication with the pawl 320 and is configured to disengage the pawl 320 from the latch opening 312. The manually engageable control 181 can be coupled to the manually engageable mechanism 180. In the current example, the manually engageable control 181 is a button that is configured to be depressed. Depressing the manually engageable control 181 can result in linear translation of the pawl release 330 against the second end 323 of the pawl 320 to pivot the latching end 321 of the pawl 320 around the pawl pivot axis z, out of a particular latch opening 312.

In various embodiments, each of the latch openings 312 have a profile (visible in FIG. 5) that is asymmetrical. Each latch opening has a leading face 311 and a trailing face 313 opposite the leading face 311. In the current example, the profile of the leading face 311 of the latch openings 312 and the profile of the trailing face 313 of the latch openings have different shapes. In the current example, the profile of the leading face 311 of the latch openings 312 and the profile of the trailing face 313 of the latch openings are both concave relative to the locking rail, but the curvature of the profile of the leading face 311 is less than the curvature of the profile of the trailing face 313. In various embodiments the profile of the latching end 321 of the pawl 320 is complementary to the profile of the latch openings 312 of the locking rail 310, where "complementary to" is used herein to mean that the curvatures of adjacent surfaces are structured to limit interference between the pawl 320 and the locking rail 310 when the pawl 320 is pivoted between an engaged and disengaged position.

Figure 6:
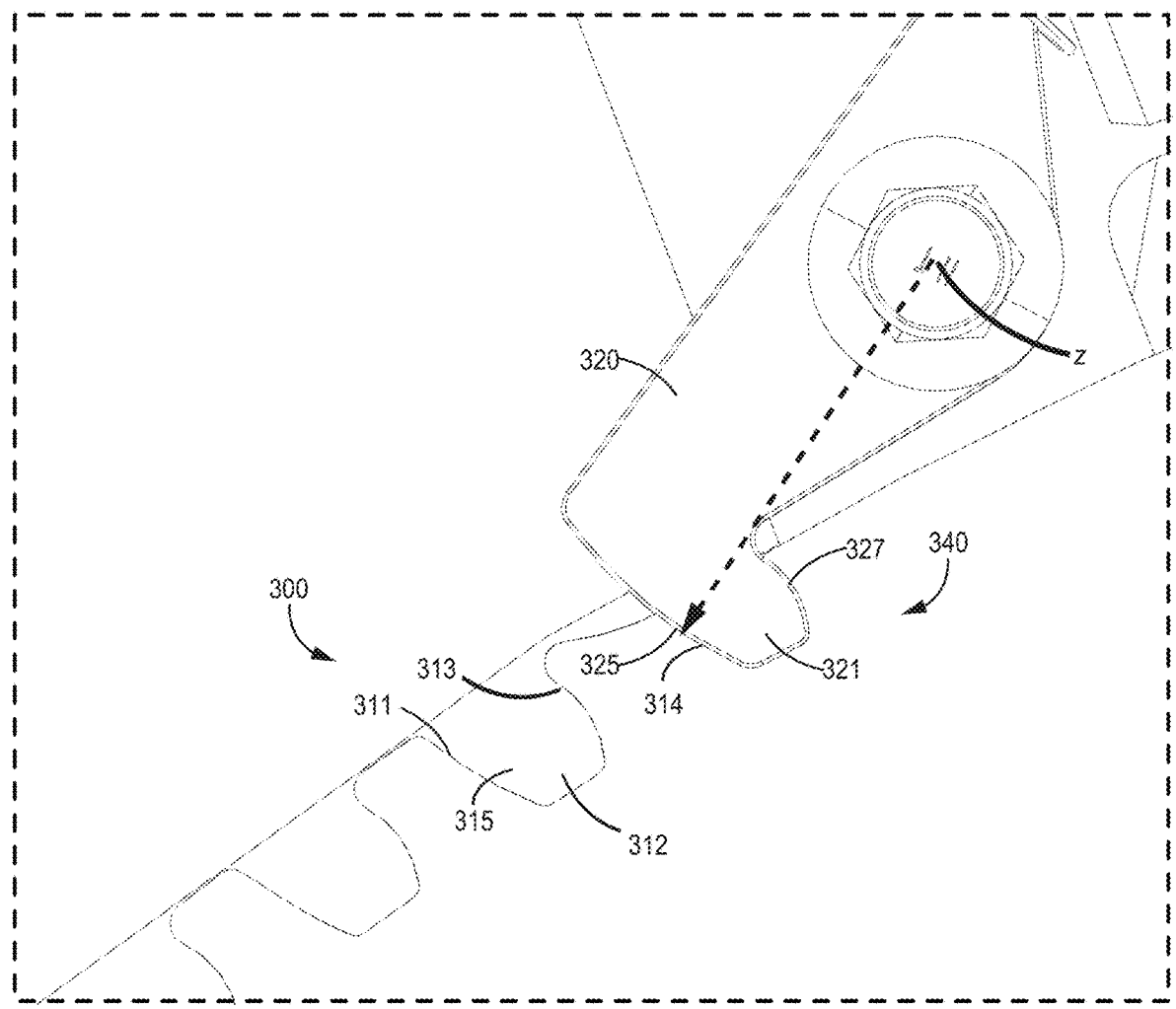
FIG. 6 is a detail view of FIG. 5.

FIG. 6 is a detail view of FIG. 5. The latching end 321 of the pawl 320 has an outer face 325 and an inner face 327, where the inner face 327 is positioned radially inward from the outer face 325 relative to the pawl pivot axis z. In some embodiments, the outer face 325 of the latching end 321 of the pawl 320 has a profile defining a radius of curvature less than or equal to the distance to the pawl pivot axis z. In some embodiments, the profile of the leading face 311 of the latch openings 312 has defines a radius of curvature greater than a radial distance to the pawl pivot axis z. Such a configuration may limit interference between the latch openings 312 and the latching end 321 of the pawl 320 when the pawl 320 is pivoted between an engaged and disengaged position. In some embodiments, the inner face 327 of the latching end 321 of the pawl 320 has a profile defining a radius of curvature less than or equal to the radius of curvature of the profile of the trailing face 313 of each of the latch openings 312. Such a configuration may limit interference between the latch openings 312 and the latching end 321 of the pawl 320 when the pawl 320 is pivoted between an engaged and disengaged position.

Figure 7:
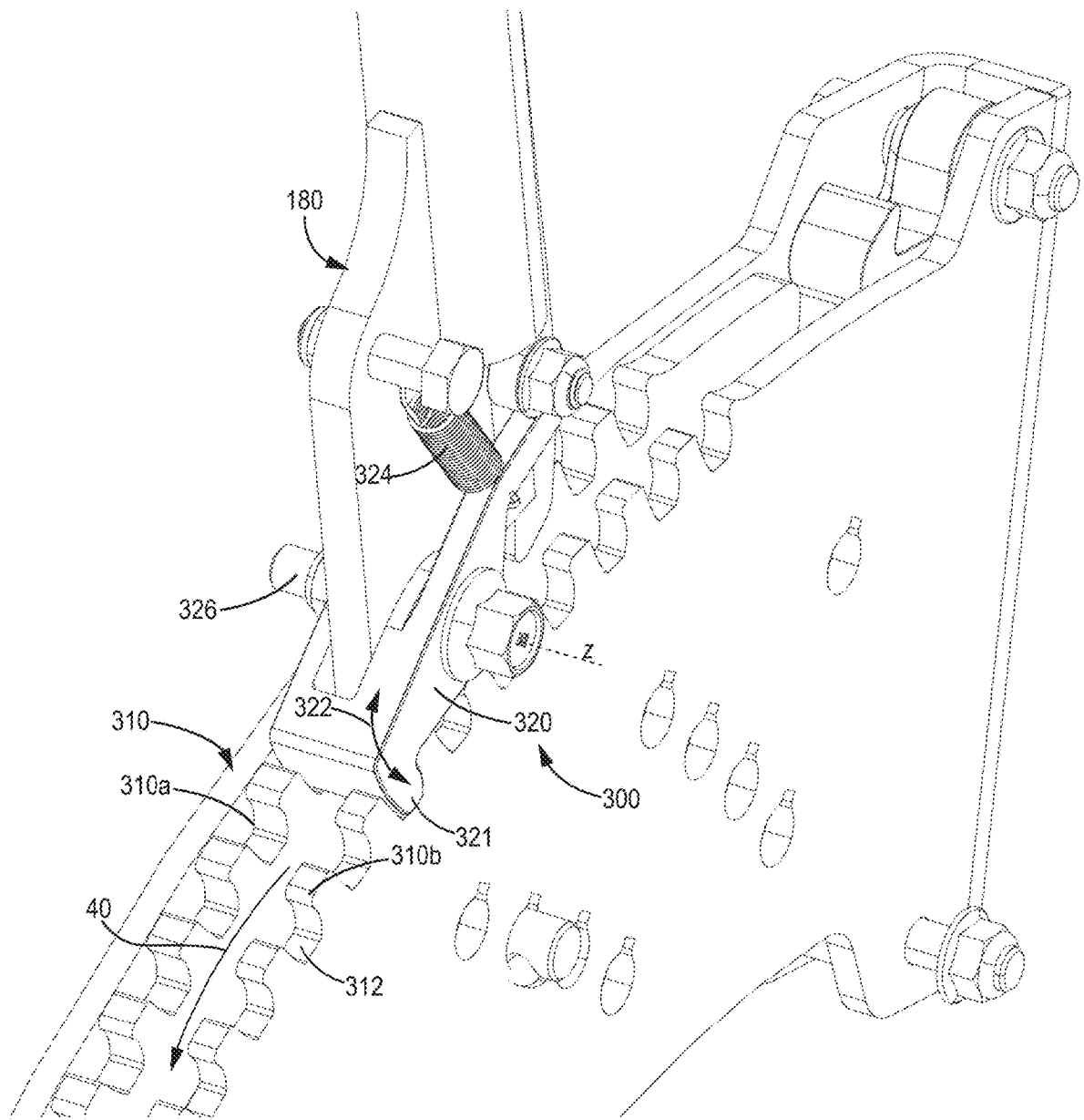
FIG. 7 is a detailed perspective view of a first locking mechanism consistent with embodiments.

FIG. 7 is a detail perspective view of the first locking mechanism 300 consistent with various embodiments. In this example, the locking rail 310 has a first side rail 310a and a second side rail 310b that extend as parallel curves along the pivot pathway 40 of the manually engageable mechanism 180. The manually engageable mechanism 180 is disposed between the first side rail 310a and the second side rail 310b, and the pawl 320 is pivotably coupled to the manually engageable mechanism 180. The latching end 321 of the pawl 320 extends from the first side rail 310a to the second side rail 310b across the pivot pathway 40. Each of the latch openings 312 is defined by both the first side rail 310a and the second side rail 310b such that the pawl 320 is configured to engage each latch opening 312 on the first side rail 310a and on the second side rail 310b.

In some implementations, when a vehicle 10 consistent with the current technology is static (and also under various dynamic operating conditions), the weight of the implement 150 exerts rotational force on the first shaft 130 and, therefore, the manually engageable mechanism 180, in a clockwise direction relative to FIG. 2, which is the counterclockwise direction in FIG. 4. The rotational force on the manually engageable mechanism 180 is directly transmitted to the latching end 321 of the pawl 320, which results in an opposing force from the locking rail 310 to the pawl 320 via the leading face 311 of the latch opening 312 within which the latching end 321 of the pawl 320 is disposed. As such, the latching end 321 of the pawl 320 is directly compressed between the manually engageable mechanism 180 and the locking rail 310, meaning that the manually engageable mechanism 180 and the locking rail 310 directly contact the latching end 321 of the pawl 320 on opposite sides of the latching end 321 of the pawl 320 such that a load is transmitted from the manually engageable mechanism 180 to the locking rail 310 through the latching end 321 of the pawl 320.

In some such implementations, the first locking mechanism 300 is configured to transmit forces resulting from the weight of the implement 150 (see FIGS. 1-3) from the manually engageable mechanism 180 directly to the latching end 321 of the pawl 320, and from the latching end 321 of the pawl 320 to the locking rail 310. By "directly" it is meant that forces are transmitted absent intervening components, such as through the fastening hardware 326 that pivotably couples the pawl 320 to the manually engageable mechanism 180. Such a configuration may advantageously limit or eliminate sheer and compressive forces on the fastening hardware 326. In various embodiments, the fastening hardware 326 defines the pawl pivot axis z. The fastening hardware 326 can be a screw, a bolt, a rivet, or another component that is configured to pivotably couple the pawl 320 on the manually engageable mechanism 180.

Figure 8:
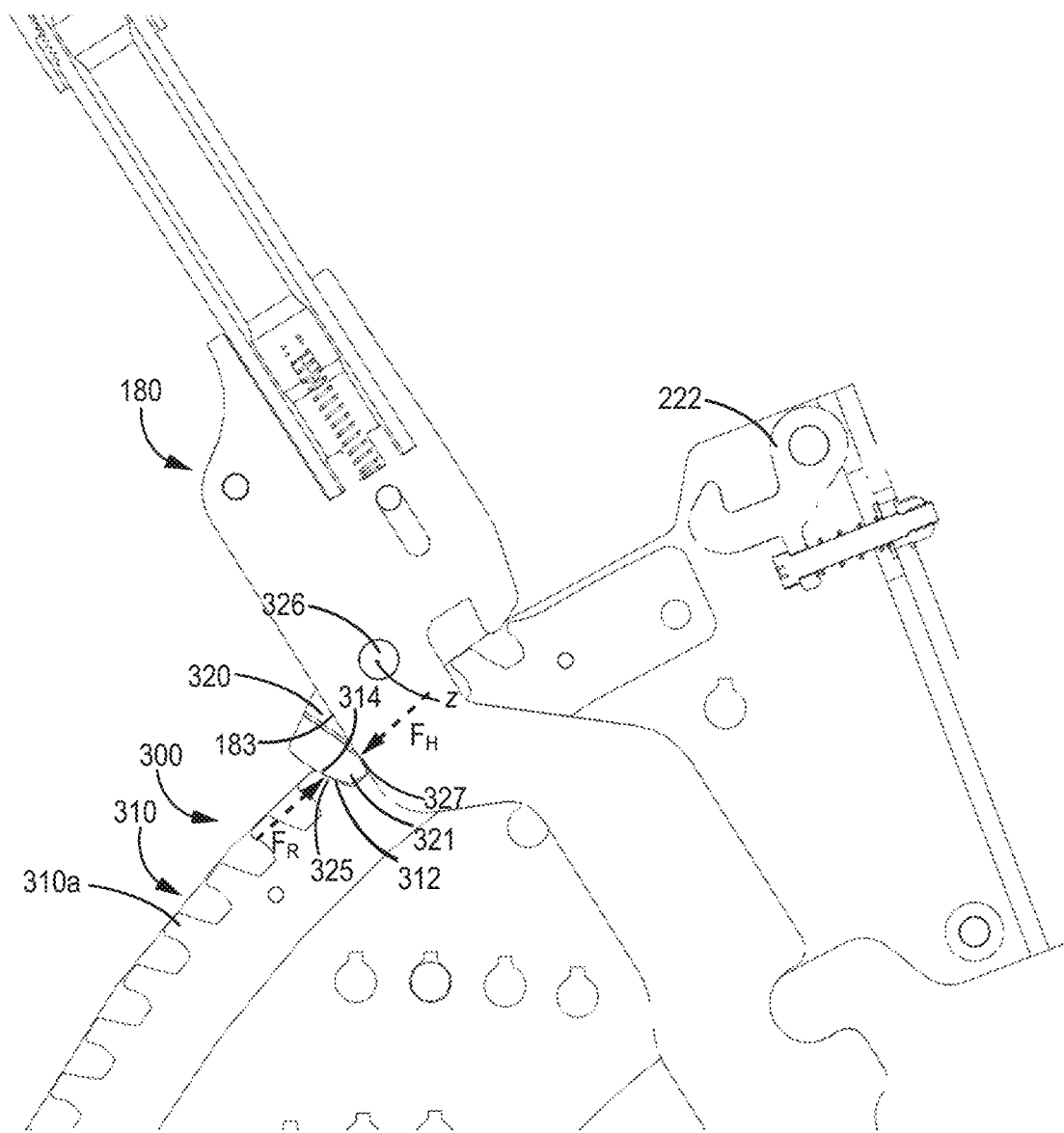
FIG. 8 is a detail cross-sectional view of the first locking mechanism engaged in a first example position.
Figure 16:
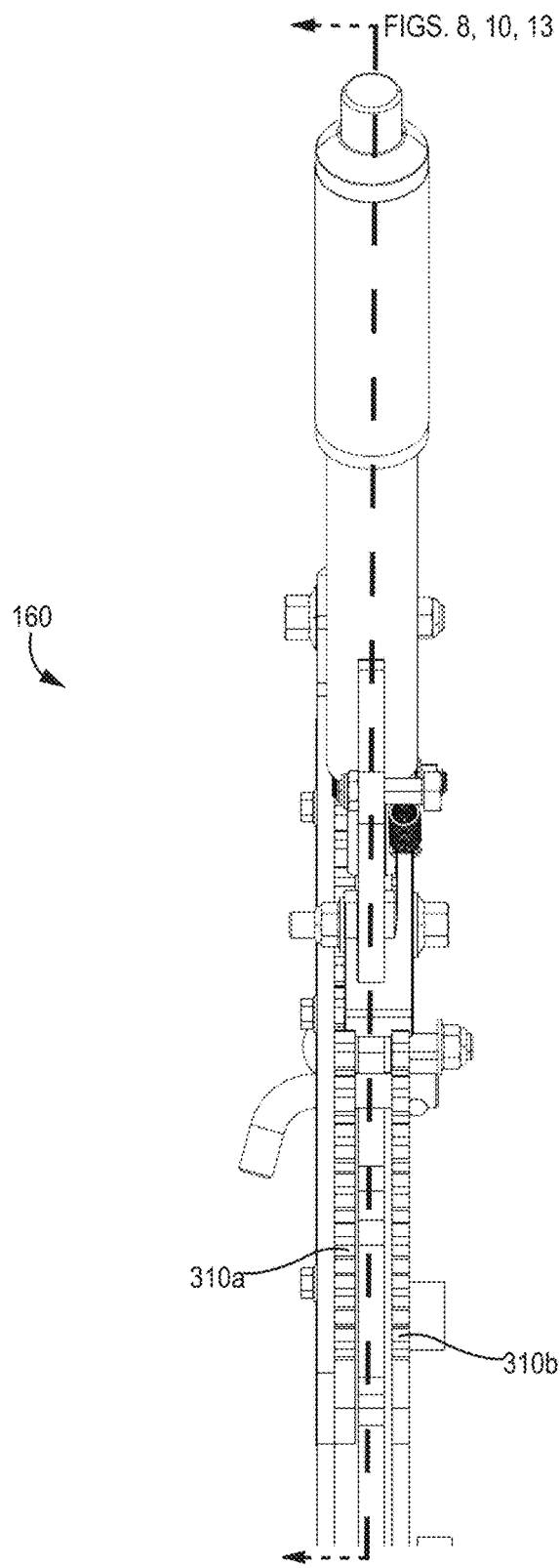
FIG. 16 is a front facing view of the height adjustment tool consistent with various embodiments.

FIG. 8 is a cross-sectional view of the example implementation described above, where the cross-section is through a plane extending between the first side rail 310a and the second side rail 310b depicted in FIG. 7. The cross-section of FIG. 8 is represented in FIG. 16, which is a detail front facing view of a height adjustment tool 160. The latching end 321 of the pawl 320 is pivoted into a particular latch opening 312. The weight of the implement (FIG. 1) pivots the manually engageable mechanism 180 in a counterclockwise direction relative to FIG. 8, which brings the outer face 325 of the latching end 321 of the pawl 320 into contact with the leading face 311 of the latch opening 312 (on both the first side rail 310a and the second side rail 310b, see FIG. 7). The rotational force on the manually engageable mechanism 180 (from the weight of the implement 150) is transmitted directly to the pawl 320 via a leading surface 183 of the manually engageable mechanism 180. The leading surface 183 of the manually engageable mechanism is positioned laterally between the first side rail 310a and the second side rail 310b (visible in FIG. 7). The leading surface 183 of the manually engageable mechanism 180 exerts a force $F_H$ on the inner face 327 of the latching end 321 of the pawl 320 between the first side rail 310a and the second side rail 310b. The locking rail 310 provides an opposing force $F_R$ on the outer face 325 of the latching end 321 of the pawl 320. The opposing force $F_R$ is positioned laterally on each side of the manually engageable mechanism force $F_H$ on the pawl 320. For purposes of the present application the latching end 321 of the pawl 320 is considered "directly compressed" despite the fact that the manually engageable mechanism force $F_H$ and the opposing force $F_R$ are not aligned in the lateral direction.

In the current configuration, the latching end 321 of the pawl 320 is under direct compression between the locking rail 310 and the manually engageable mechanism 180. Such a configuration advantageously prevents or limits forces from the weight of the implement 150 (FIG. 1) and opposing forces from the locking rail 310 from being transmitted to the fastening hardware 326 via the manually engageable mechanism 180 and the locking rail 310, which may advantageously extend the life of the fastening hardware 326 and the pawl 320.

When the first locking mechanism 300 is engaged and the vehicle 10 (FIG. 1) is under dynamic operating conditions where external forces on the implement 150 or other components result in momentary clockwise rotational forces on the manually engageable mechanism 180 (relative to FIG. 8) that overcome the force of the weight of the implement 150 on the manually engageable mechanism 180, the clearance in the latch opening 312 allows limited rotation of the manually engageable mechanism 180 until the inner face 327 of the pawl 320 makes contact with the trailing face 313 of the latch opening 312 (more clearly visible in FIG. 6). It is noted that for purposes of the present disclosure, the manually engageable mechanism 180 is considered "fixed" to the locking rail 310 despite the clearance between the pawl 320 and the latch opening 312 allowing such limited rotation.

Figure 9:
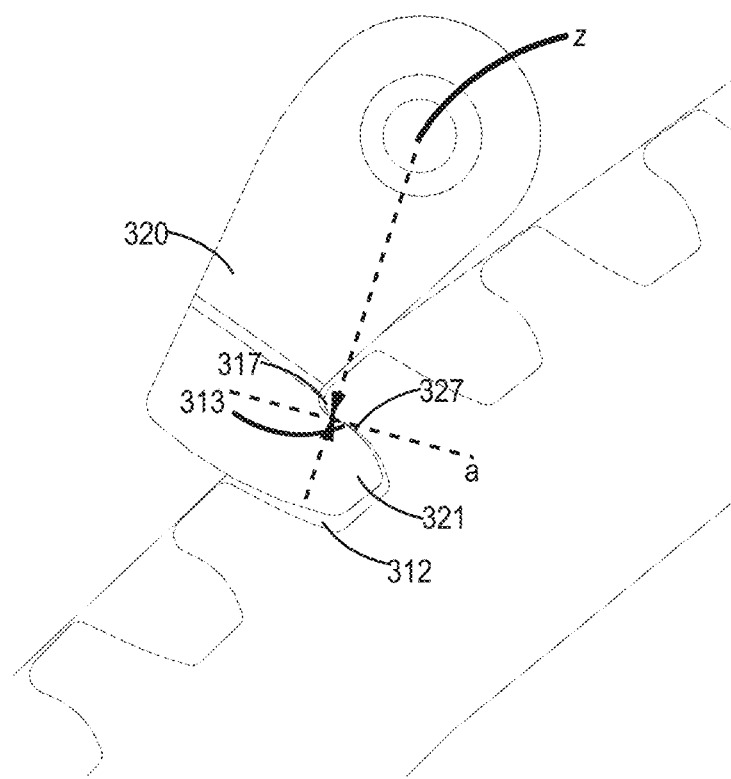
FIG. 9 is a detail cross-sectional view of the pawl and latch opening depicted in FIG. 8.

FIG. 9 is a detail view of such a configuration where the manually engageable mechanism 180 (omitted from FIG. 9 but visible in FIG. 8) is pivoted slightly in the clockwise direction such that the inner face 327 of the pawl 320 contacts the trailing face 313 of the latch opening 312. In various embodiments the linear force between the inner face 327 of the pawl 320 and the trailing face 313 of the latch opening 312 is colinear with the pawl pivot axis z. In various embodiments the contact area a between the inner face 327 of the pawl 320 and the trailing face 313 of the latch opening 312 is perpendicular to a line extending radially outward from the pawl pivot axis z. In various embodiments the open end of the latch opening 312 defines a lip 317 on the trailing face 313. Such a lip 317 can prevent disengagement of the pawl 320 from the latch opening 312 upon opposing forces between the inner face 327 of the pawl 320 and the trailing face 313 of the latch opening 312.

Some vehicles consistent with the technology disclosed herein incorporate a transport lock that is configured to raise and secure the implement 150 relative to the vehicle frame 124 at a transport height. Such a transport lock can be used, for example, when the vehicle 10 is being transported, for example. The transport height ($H_T$, see FIG. 2) between the implement 150 and a horizontal ground surface 101 is greater than each operating height of the implement 150. The transport lock can be considered a component of the height selection tool. The transport lock can be configured to releasably fix the manually engageable mechanism 180 relative to the locking rail 310 to define a transport height. It is noted that in some implementations of the current technology, a transport lock can be omitted.

The transport lock can share components with the first locking mechanism 300 such as the first locking mechanism 300 previously described. For example, the transport lock 340 can include a first latch opening 314 of the plurality of latch openings 312 (FIG. 4) of the locking rail 310 and the pawl 320. The transport lock 340 can define the transport height setting when the pawl 320 engages the first latch opening 314. In such an example, the first latch opening 314 is a component of the transport lock 340 and a second latch opening 315 to a last latch opening 316 (visible in FIG. 4)

are components of the first locking mechanism 300. In such an example, the pawl 320 is a component of both the transport lock 340 and the first locking mechanism 300. Another example transport lock will now be described.

Figure 10:
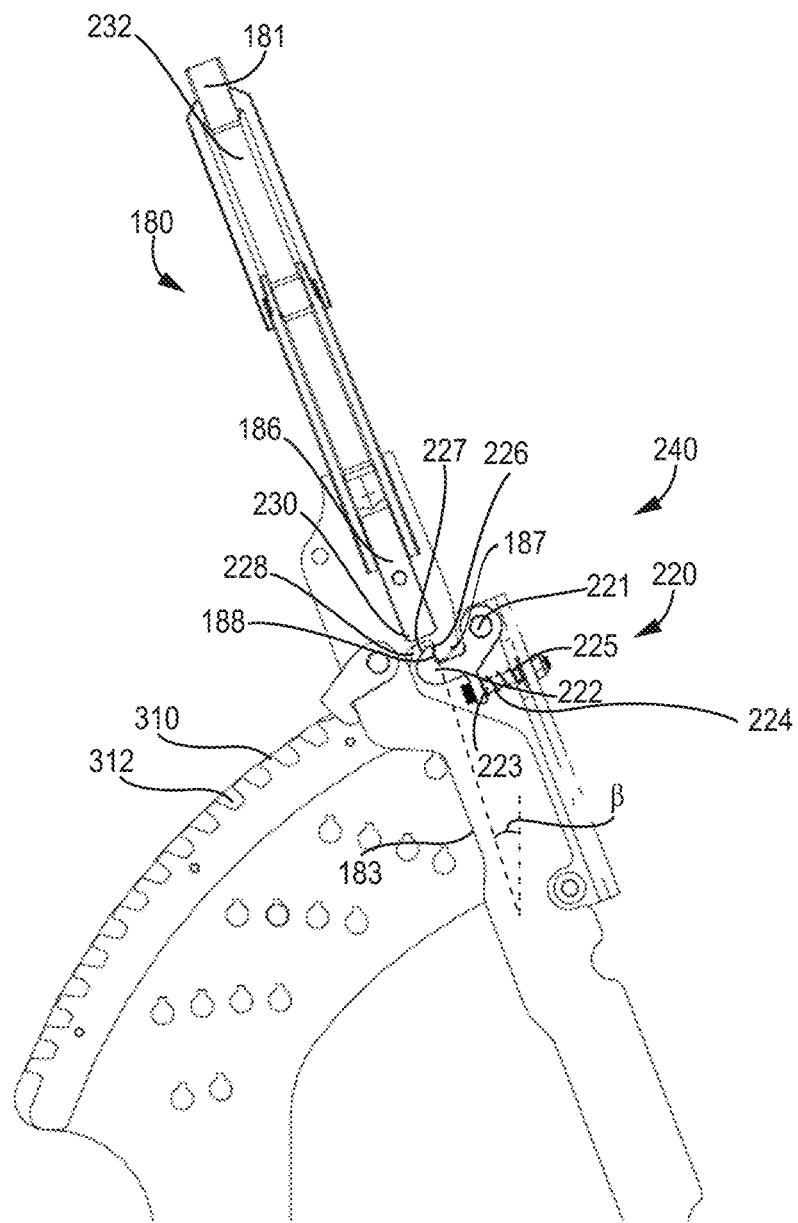
FIG. 10 depicts a cross-sectional view of components depicted in FIG. 5.

FIG. 10 depicts a cross-sectional view of an example transport lock 240 consistent with various embodiments, where the cross-section is through the manually engageable mechanism 180 and the first locking mechanism 300 depicted in FIG. 5. The cross section of FIG. 10 is represented in FIG. 16. FIG. 10 depicts the transport lock system in an engaged position. In the engaged position, the implement 150 is at a maximum vertical position relative to a horizontal ground surface 101 (see FIG. 2). In a variety of embodiments, in the engaged position the transport height $H_T$ (FIG. 2) of the implement 150 is greater than the maximum selectable operating height $H_{op}$ of the implement 150. In the current example, the transport lock system is configured to retain the first shaft 130 in a particular orientation about the second rotational axis y against gravity. In various embodiments the transport lock system is configured to retain the first shaft 130 in a particular orientation about the second axis y in each direction (rather than in a single direction).

The transport lock generally uses the manually engageable mechanism 180, which is the manually engageable mechanism 180, that has a latched position as shown in FIG. 10 and unlatched position (shown in FIG. 8, as an example). The transport lock system generally has a latch 222, a latch engagement surface 188, a latch release 186, and a manually engageable control 181.

The latch 222 is pivotably coupled to the vehicle frame 124 (see FIG. 3, for example). The latch 222 is generally configured to releasably fix the manually engageable mechanism 180 relative to the vehicle frame 124. In the current example, the latch 222 is pivotably coupled to the locking rail 310. The latch 222 can be pivotably coupled to the vehicle frame 124 at a pivot point 221. In some embodiments, the latch 222 is a component of a latch assembly 220. The latch assembly 220 can be configured to bias the latch 222 in a first orientation. In some such embodiments, the first orientation is consistent with a latched position. In the current example, a latch spring 224 having a first end 223 coupled to the latch 222 and a second end 225 coupled to the vehicle frame 124, biases the latch 222 in towards a latched position.

The latch 222 is configured to engage the latch engagement surface 188 of the manually engageable mechanism 180 in the latched position. The latch 222 is disengaged from the manually engageable mechanism 180 in the unlatched positions. More particularly, the latch 222 defines a mechanism engagement surface 226 that is configured to oppose the latch engagement surface 188 of the manually engageable mechanism 180. In various embodiments, the mechanism engagement surface 226 and the latch engagement surface 188 are configured to make direct contact to frictionally engage. As such, in various embodiments, the mechanism engagement surface 226 and the latch engagement surface 188 are parallel surfaces. Furthermore, the mechanism engagement surface 226 (and, therefore, the latch engagement surface 188 in some embodiments) can be configured at an angle β from a vertical plane when in a latched position. The angle β can be within 45° from vertical in some embodiments. In various embodiments the angle β is greater than 0° from vertical or greater than 1° from vertical. In some embodiments the angle β ranges from 2° to 10° from vertical. Such a configuration can increase the pressure between the latch engagement surface 188 and the mechanism engagement surface 226 to reduce the likelihood of unintended disengagement of the latch 222.

In the current example, to engage the transport lock system in a latched position, the manually engageable mechanism 180 is pivoted clockwise relative to FIG. 7 about the second rotational axis y (see FIGS. 4, for example). The manually engageable mechanism 180 is pivoted clockwise beyond each of the plurality latch openings 312, which raises the implement 150 to a vertical position greater than the maximum operating height. As the manually engageable mechanism 180 is pivoted, a ramped surface 187 defined by a trailing surface of the manually engageable mechanism 180 applies a pivot force to a corresponding surface 227 of the latch 222, which pivots the latch 222 clockwise against the biasing force of the latch spring 224. Continued pivoting of the manually engageable mechanism 180 in the clockwise direction progresses the ramped surface 187 past the corresponding surface 227 of the latch 222 and the biasing force of the latch spring 224 pivots the latch 222 clockwise such that the mechanism engagement surface 226 is rotated into a latch receptacle 228 defined by the manually engageable mechanism 180 and the mechanism engagement surface 226 is brought into abutting contact with the latch engagement surface 188. The transport lock system is configured to remain engaged until released with a latch release 186.

The latch release 186 is generally configured to push the latch 222 out of engagement with the latch engagement surface 188. In the current example, the latch release 186 is configured to pivot the latch 222 in the counterclockwise direction (relative to FIG. 10) to push the latch 222 out of engagement with the latch engagement surface 188. In FIG. 10 the latch release 186 is in a retracted position where the latch release 186 is clear of the latch receptacle 228. In the extended position the latch release 186 is configured to extend alongside the latch engagement surface 188 of the manually engageable mechanism 180. When engaged, the latch release 186 is configured to counteract the latch bias to rotate the latch 222 to a second orientation where the latch 222 is out of engagement with the latch engagement surface 188 and the latch 222 is outside of the latch receptacle 228.

In the current example, the latch release 186 is a mechanical communication chain extending from the manually engageable control 181 through the manually engageable mechanism 180 towards the latch receptacle 228. The latch release 186 has a first end 230 that is the release surface 230 and a second end 232 that is the opposite end of the rod from the release surface 230. The release surface 230 is the leading surface of the latch release 186 as it translates towards the latch 222. The release surface 230 is configured to contact the latch 222 and push the latch 222 out of the latch receptacle 228 so that the mechanism engagement surface 226 is pushed out of engagement with the latch engagement surface 188. In particular, the release surface 230 is configured to pivot the latch from its first orientation depicted in FIG. 10, which is the latched position, to a second orientation, which is an unlatched position. The latch release 186 can have a variety of different configurations consistent with the technology disclosed herein.

In various embodiments, the latch release 186 is biased to be in a retracted position (such as depicted in FIG. 10). In the current example, a latch release spring (not currently visible) is disposed between the latch release 186 and the manually engageable mechanism 180 to bias the latch release 186 in the retracted position. The latch release spring can be compressed between the latch release 186 and the manually engageable mechanism 180.

The manually engageable control 181 is generally coupled to the manually engageable mechanism 180 in operative communication with the latch release 186. In various embodiments, the manually engageable control 181 is configured to be depressed by a user to disengage the latch 222 from the latch engagement surface 188. More particularly, the manually engageable control 181 is configured to be depressed by a user to push the latch 222 out of engagement with the latch engagement surface 188. In various embodiments, the manually engageable control 181 is a depressible button in mechanical communication with the latch release 186. The depressible button 181 extends beyond a distal end of the manually engageable mechanism 180 to be depressed by a user. In embodiments consistent with the current example, the depressible button 181 is in mechanical communication with the second end 232 of the latch release 186, and the first end 230 of the latch release 186 is configured to come into contact with the latch 222. In some embodiments, a latch release spring is configured to bias the manually engageable control 181 (as well as the latch release 186) in an extended position beyond the distal end of the manually engageable mechanism 180, as depicted in FIG. 10. While, in the current embodiment, the manually engageable control 181 and the latch release 186 are defined by two separate components, in some embodiments the manually engageable control 181 and the latch release 186 are defined by a single component, such as a rod. In some other embodiments, the manually engageable control 181 and the latch release 186 can be defined by more than two segments that form a mechanical communication chain from the manually engageable control 181 to the latch release 186.

In various embodiments, to release the latch 222 from the manually engageable mechanism 180, the user pivots the manually engageable mechanism 180 slightly in a clockwise direction (relative to FIG. 10) to introduce clearance between the mechanism engagement surface 226 and the latch engagement surface 188, which eliminates the frictional forces between the surfaces. The manually engageable control 181 is depressed with a force to overcome the biasing force of each of the latch release spring and the latch spring 224. Depressing the manually engageable control 181 linearly translates the latch release 186 axially along the manually engageable mechanism 180, resulting in translation of the latch release 186 (and compression of the latch release spring). The first end 230 of the latch release 186 translates through the latch receptacle 228 and pushes the latch 222 out of the latch receptacle 228, which pivots the latch 222 in a counterclockwise direction about the pivot point 221. Pivoting of the latch 222 results in compression of the latch spring 224. While the button 181 is depressed, the release surface 230 of the latch release 186 obstructs reentry of the latch 222 to the latch receptacle 228. The manually engageable mechanism 180 can then be pivoted in a counterclockwise direction away from the latch 222, which allows the implement 150 (FIG. 2) to be lowered to a selected operating height $H_{op}$ defined by the locking rail, an example of which has been described in detail, above.

It should be noted that in the current example, the manually engageable control 181 is configured to actuate both the pawl release 330 and the latch release 186. In particular, the pawl release 330 is fixed to the latch release 186 such that linear translation of the latch release 186 actuated by the manually engageable control 181 results in equal linear translation of the pawl release 330. In some other embodiments, the manually engageable control 181 can be configured to actuate one of the pawl release 330 and the latch release 186, and a second control can be configured to actuate the other of the pawl release 330 and the latch release 186. The second control can be a depressible button, a dial, a switch, or the like.

Figure 11:
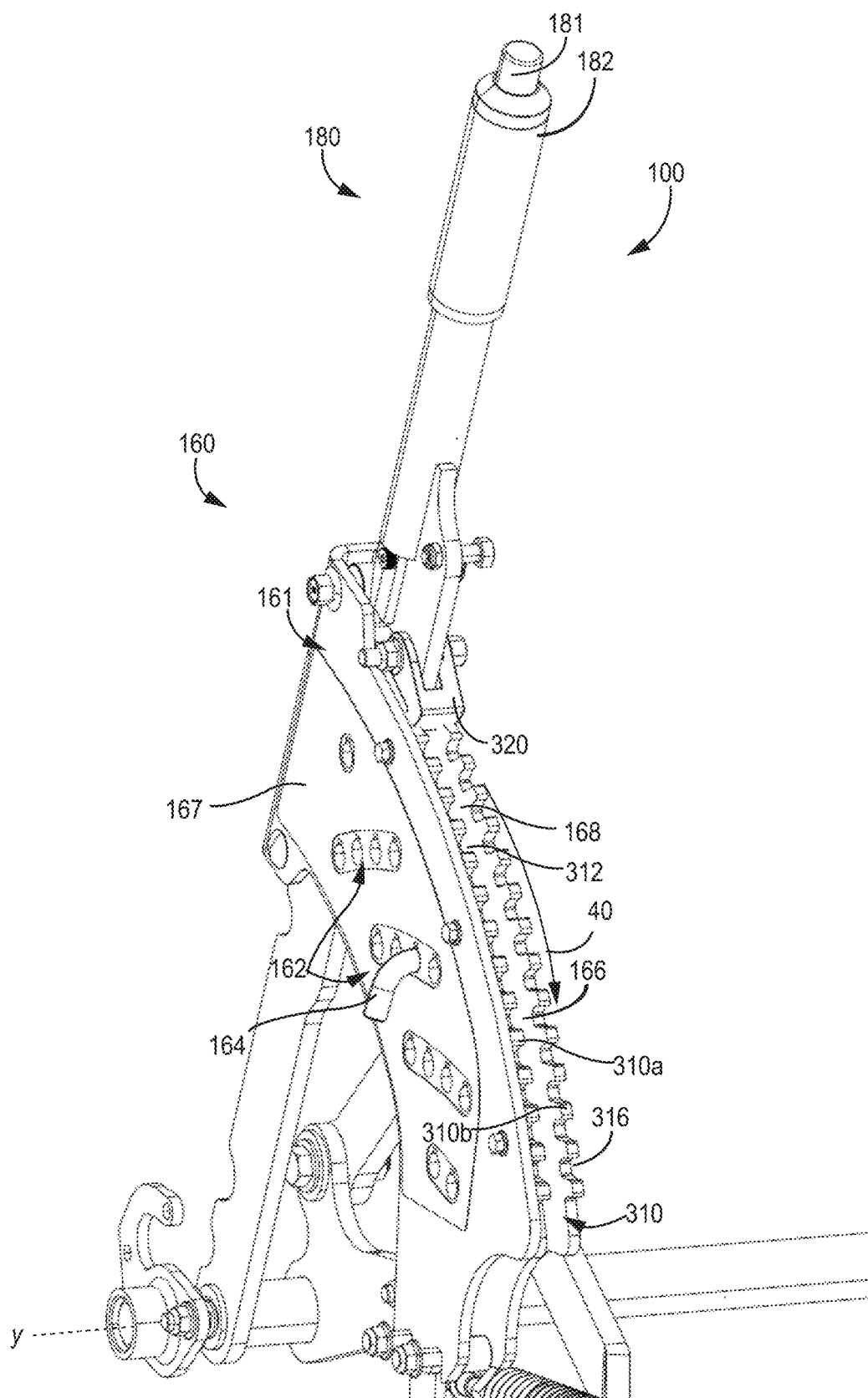
FIG. 11 is a detail view of components depicted in FIG. 3.

Some examples of the technology disclosed herein have a second locking mechanism 161 in addition to the first locking mechanism 300. The second locking mechanism 161 can be a component of the height selection tool 160. The second locking mechanism is generally configured to obstruct pivoting of the manually engageable mechanism 180 in a first direction and allow pivoting of the manually engageable mechanism 180 in a second direction opposite the first direction. More particularly, the second locking mechanism 161 is configured to prevent lowering of the implement 150 relative to the vehicle frame 124 but allows raising of the implement 150 relative to the vehicle frame 124 via the manually engageable mechanism 180. The second locking mechanism 161 is described in view of FIG. 11 and FIG. 3, where FIG. 11 is a detail view of the height selection tool of FIG. 3. It should be noted that in some embodiments the second locking mechanism 161 can be omitted.

The second locking mechanism 161 generally defines the plurality of height settings 162, which are each selectable by a user. The plurality of height settings 162 can be discrete locations defined by the vehicle frame 124. Each height setting 162 is defined by a corresponding pin opening in a first plurality of pin openings 162, which defines a limit on the distance between the implement 150 and the vehicle frame 124 and/or the ground surface 101. In various examples, a locking pin 164 is configured to be manually removed from one pin opening of the first plurality of pin openings 162 and manually inserted into another pin opening of the first plurality of pin openings 162 to change the vertical position of the implement 150 relative to the vehicle frame 124 and/or the ground surface 101. In particular, the locking pin 164 of the second locking mechanism 161 is inserted into a pin opening of the first plurality of pin openings 162 to define (1) the limit on the distance (or the maximum distance) between the implement 150 relative to the vehicle frame 124 at that particular height setting and (2) the pre-selected operating height $H_{op}$ of the implement 150 relative to the ground surface 101.

In various implementations, when engaged at each discrete height setting, the second locking mechanism 161 prevents downward vertical translation of the implement 150 below the selected height setting. Accordingly, in the current example when the locking pin 164 is positioned in each of the first plurality of pin openings 162 the locking pin 164 obstructs translation of the implement 150 downward, below the particular pre-selected operating height $H_{op}$ defined by the height setting. There are various configurations that would allow this functionality.

In examples consistent with the current embodiment, the locking pin 164 opposes the rotational force exerted on the first shaft 130 by the weight of the implement 150 on the bell cranks, which retains the first shaft 130 in a particular orientation against gravity. Indeed, the second locking mechanism 161 is configured to retain the first shaft 130 in any one selected orientation among a plurality of discrete selectable orientations about a second rotational axis y to define a corresponding plurality of discrete vertical positions of the implement 150 relative to the vehicle frame 124. More particularly, the second locking mechanism 161 defines a pin pathway 166 that the locking pin 164 is configured to extend through when received by one or more pin openings corresponding to a particular height setting. The second locking mechanism 161 has a first panel 167 defining a first plurality of pin openings 162 on one side of the pin pathway 166 and a second panel 168 defining an aligned plurality of pin openings 163 (visible in FIG. 4) on an opposite side of the pin pathway 166. Each of the first panel 167 and the second panel 168 are fixed to the vehicle frame 124 and form a portion of the vehicle frame 124. When pivoted about the second rotational axis y, the manually engageable mechanism 180 is configured to translate through the pin pathway 166.

The locking pin 164 is configured to obstruct pivoting of the manually engageable mechanism 180 along the pin pathway 166 beyond a point that would result in lowering the implement 150 below the selected height setting. In particular, the manually engageable mechanism 180 has a leading surface 183 (visible in FIG. 10) that is configured to receive the locking pin 164 when the locking pin 164 is disposed in one pin opening of the plurality of pin openings 162 across the pin pathway 166. As such, the forces on the manually engageable mechanism 180 from the weight of the implement 150 are transmitted to the locking pin 164. The locking pin 164 is configured to obstruct pivoting of the manually engageable mechanism 180 in a downward or clockwise direction (relative to FIG. 11) about the second rotational axis y beyond the locking pin 164. That is to say, the locking pin 164 obstructs pivoting of the first shaft 130 in the direction that would result in lowering the implement 150 below the selected height setting (e.g., clockwise). Each pin opening corresponds to a particular orientation of the first shaft 130 relative to the second rotational axis y (FIG. 11) that results in a discrete implement height setting. In various embodiments the locking pin 164 obstructs rotation of the first shaft 130 in only one direction about the second rotational axis y (e.g., clockwise), and permits rotation of the first shaft 130 in the opposite direction about the second rotational axis y (e.g., counterclockwise).

In the current example, the locking rail 310 of the first locking mechanism 300 is integral with the first panel 167 and the second panel 168. The first side rail 310a is integral with the first panel 167 and the second side rail 310b is integral with the second panel 168. The locking rail 310 forms an outer circumferential boundary of the first panel 167 and the second panel 168. In some other embodiments, the locking rail 310 is a separate component from the first panel 167 and/or the second panel 168.

To change the height setting of the implement 150 in a vehicle 10 having a first locking mechanism 300 and a second locking mechanism 161, a user can grasp the engagement end 182 and pull the manually engageable mechanism 180 to pivot the manually engageable mechanism 180 counterclockwise (relative to FIG. 11) about the second rotational axis y. Pivoting the manually engageable mechanism 180 eliminates forces on the locking pin 164 by the leading surface 183 of the mechanism 180, which allows the user to engage the second locking mechanism 161 by removing the locking pin 164 from the first plurality of pin openings 162. If the pin opening 162 that defines the desired operating height $H_{op}$ is below the current position of the manually engageable mechanism 180, then the first locking mechanism 300 can remain engaged. If the pin opening 162 that defines the desired operating height $H_{op}$ is above the current position of the manually engageable mechanism 180, then the pawl release 330 can be engaged, such as by pressing the depressible button 181, to disengage the pawl 320 from the current latch opening 312 to allow pivoting of the manually engageable mechanism 180 above the particular pin opening 162 that defines the desired operating height $H_{op}$ of the implement 150.

The locking pin 164 is inserted into the particular pin opening 162 corresponding to the desired operating height $H_{op}$ of the implement 150. The pawl release 330 is engaged, if not already engaged, to allow pivoting of the manually engageable mechanism 180. The manually engageable mechanism 180 can then be pivoted and lowered by the user to lower the implement 150 to the selected operating height $H_{op}$, at which point the leading surface 183 of the manually engageable mechanism 180 rotates into contact with the locking pin 164, which obstructs the manually engageable mechanism 180 from further pivoting beyond the locking pin 164. It is noted that the locking pin 164, in the current example, does not prevent counterclockwise rotation of the first shaft 130, but the first locking mechanism 300 does prevent counterclockwise rotation of the first shaft 130.

Figure 13:
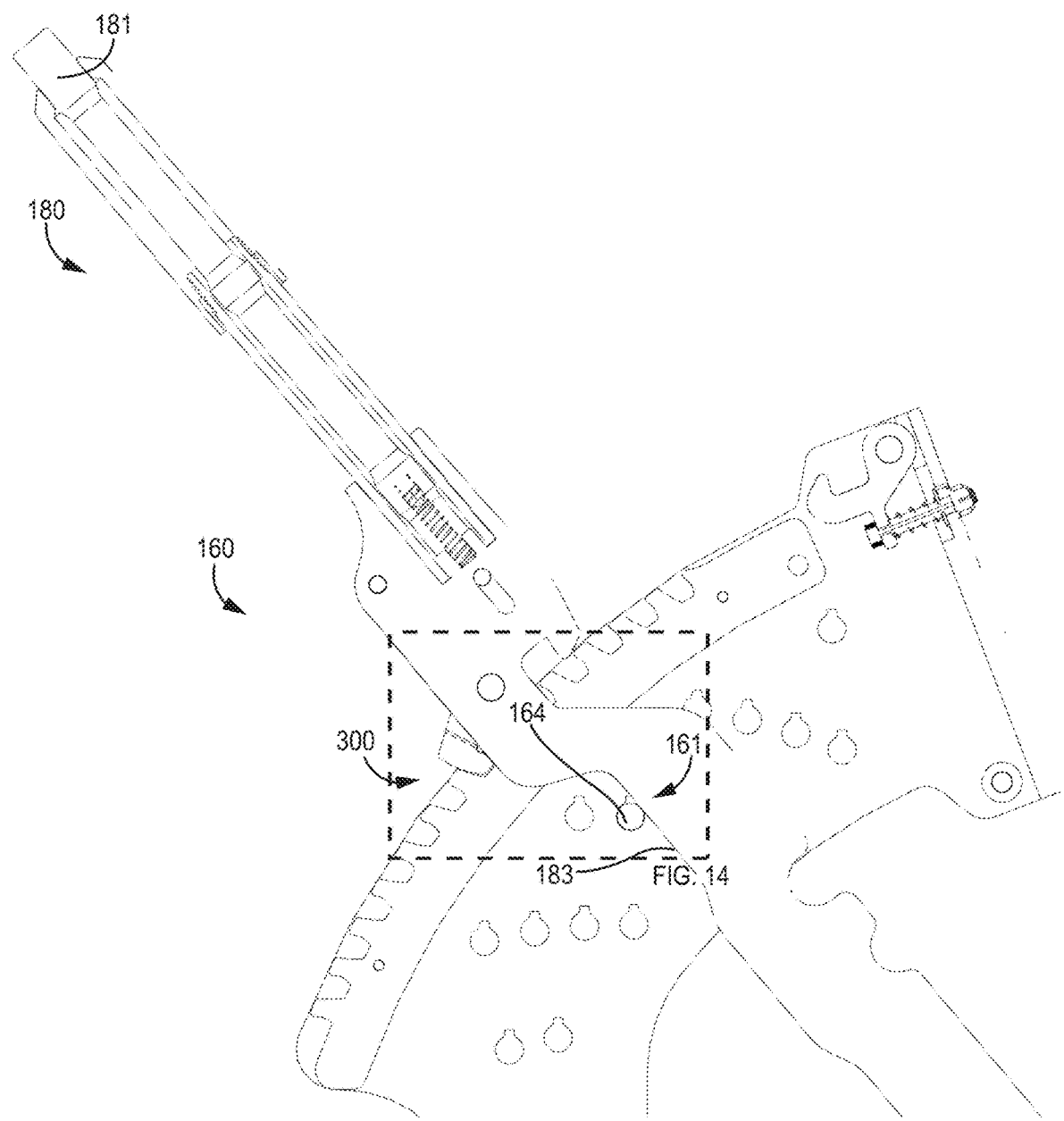
FIG. 13 is a cross-sectional view of a height selection tool consistent with various examples.

In various embodiments, each of the plurality of height settings are defined by both a corresponding latch opening 312 and a corresponding pin opening 162. As such, when the locking pin 164 is inserted into a particular pin opening 162 corresponding to a particular height setting, the pawl pathway 322 (FIG. 5) aligns with a latch opening 312 that also corresponds to the particular height setting. As such, when the implement height is set by inserting the locking pin 164 into a pin opening 162, the depressible button 181 can be released to allow engagement of a corresponding latch opening 312 by the pawl 320. FIG. 13 is a cross-sectional view of a height selection tool consistent with such an example, where the cross-section is through a plane extending between the first side rail 310a and the second side rail 310b generally represented in FIG. 16, and FIG. 14 is a detail view of FIG. 13.

In accordance with some embodiments disclosed herein, under static conditions the second locking mechanism 161 is generally maintained under shear and/or compressive forces between the implement 150 and the vehicle frame 124 (FIGS. 1 and 2). As discussed above, in order to set the operating height of the implement 150, it may be necessary or desirable to first release the forces on the locking pin 164 before the locking pin 164 is moved to a second height setting by pivoting the manually engageable mechanism 180 out of contact with the locking pin 164 (in a clockwise direction in FIG. 13). Further, in accordance with some embodiments disclosed herein, under static conditions and when the second locking mechanism 161 is engaged, the first locking mechanism 300 is not under shear and/or compressive forces between the implement 150 and the vehicle frame 124. Thus, disengaging the first locking mechanism 300 is not resisted by interference between the locking rail 310 and the pawl 320. To achieve such a configuration, each latch opening 312 and the pawl 320 are sized to have a sufficient clearance to prevent interference between the locking rail 310 and the pawl 320 when a locking pin 164 is inserted in each pin opening 162, which is more clearly visible in FIG. 14.

Figure 14:
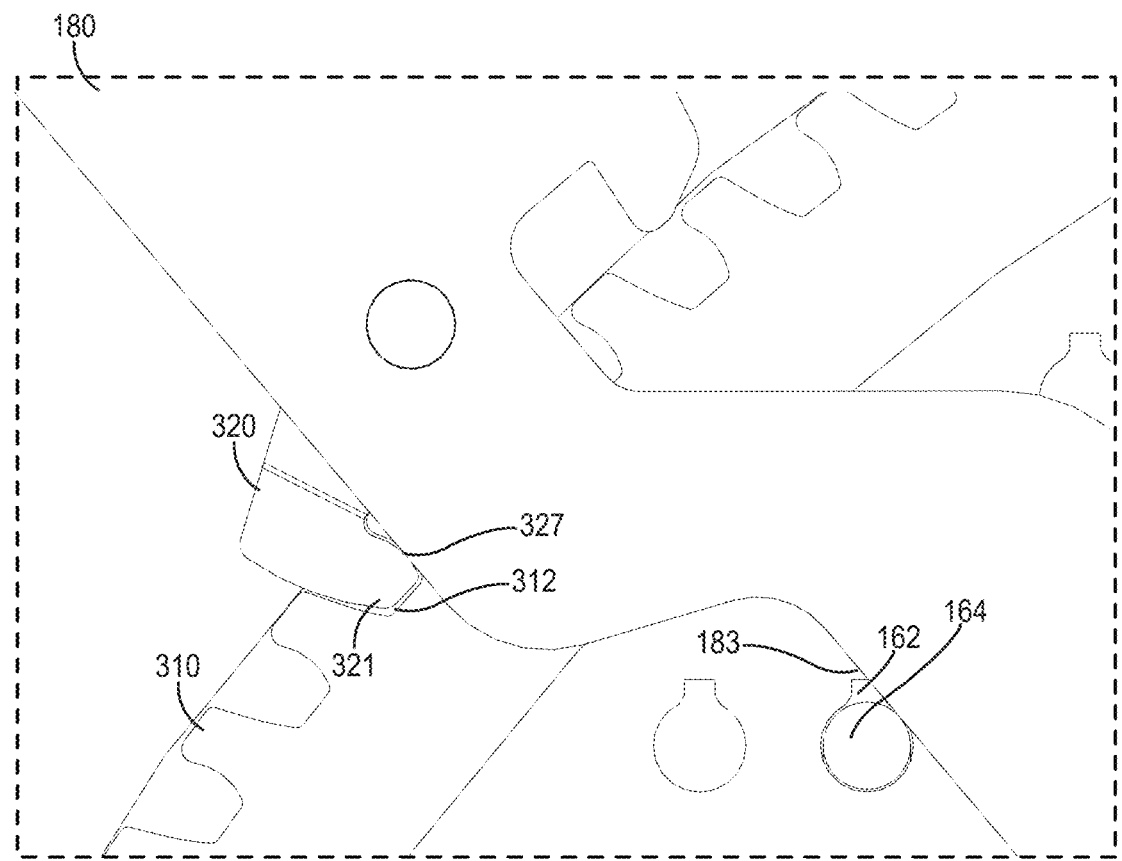
FIG. 14 is a detail view of FIG. 13.
Figure 15:
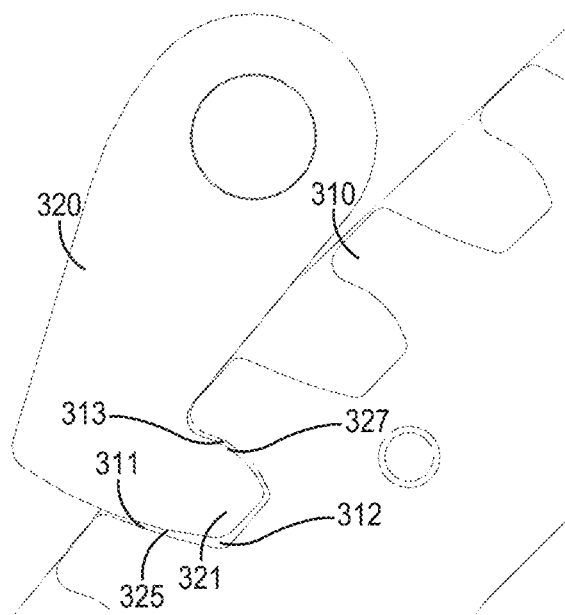
FIG. 15 is a detail view corresponding to FIG. 14.

The weight of the implement 150 (FIGS. 1-3) pivots the manually engageable mechanism 180 in a counterclockwise direction relative to FIGS. 13-14, which brings the leading surface 183 of the manually engageable mechanism into contact with the locking pin 164 disposed within a pin opening 162 (through both the first panel 167 and the second panel 168, see FIG. 11). The rotational force on the manually engageable mechanism 180 (from the weight of the implement 150) is transmitted directly to the locking pin 164 via the leading surface 183 of the manually engageable mechanism 180. The leading surface 183 of the manually engageable mechanism is positioned laterally between the first panel 167 and the second panel 168 (FIG. 11). The leading surface 183 of the manually engageable mechanism 180 contacts the inner face 327 of the latching end 321 of the pawl 320 between the first side rail 310a and the second side rail 310b (FIG. 7). However, a clearance is defined between the latching end 321 of the pawl 320 and the latch opening 312, which is depicted in the detail view of FIG. 15, where the manually engageable mechanism 180 in FIG. 14 is omitted. In particular, a clearance is defined between the outer face 325 of the pawl 320 and the leading face 311 of the latch opening 312. Similarly, a clearance is defined between the inner face 327 of the pawl 320 and the trailing face 313 of the latch opening 312. The clearance distance can range from 0.1 mm to about 2 mm, although other clearance distances are certainly possible.

In various embodiments consistent with the current example implementation, interference between the pawl 320 and the locking rail 310 is configured to occur under dynamic operating conditions where momentary variable forces act on the implement 150, manually engageable mechanism 180, bell cranks, or other components that may cause pivoting of the manually engageable mechanism 180 that is not otherwise obstructed by the second locking mechanism, such as pivoting in an upward direction. For example, an upward force on the implement 150 can pivot the manually engageable mechanism 180 is pivoted slightly in the clockwise direction (relative to FIGS. 14 and 15) until the inner face 327 of the pawl 320 contacts the trailing face 313 of the latch opening 312 to prevent further rotation of the manually engageable mechanism 180.

In various embodiments consistent with the current example implementation, interference between the pawl 320 and the locking rail 310 is configured to occur when the second locking mechanism 161 is disengaged, such as when the locking pin 164 is removed from a particular pin opening 162 (FIG. 14). As discussed with reference to FIG. 8, the latching end 321 of the pawl 320 is compressed between the leading surface 183 of the manually engageable mechanism 180 and the leading face 311 of the latch opening 312 to maintain the vertical position of the implement 150 and the orientation of the manually engageable mechanism 180.

Various configurations can be employed to provide users with a mechanical advantage to overcome the weight of the implement 150 in order to pivot the manually engageable mechanism 180 away from the locking pin 164. Various implementations of the technology disclosed herein incorporate one or more implement springs 200, 210 that are each configured to oppose the weight of the implement 150 on the height selection tool 160 (such as the first locking mechanism 300 and/or the second locking mechanism 161), which is now described with reference to FIGS. 2-4.

The height selection tool 160 has a first implement spring 200. The first implement spring 200 has a first end 201 fixed to the vehicle frame 124 and a second end 202 fixed to the first rigid linkage 190, which is best visible in FIG. 2. The first implement spring 200 exerts a linear force on the linkage 190 that opposes the force on the linkage 190 by the weight of the implement 150 acting on the first bell crank 132 (not visible in FIG. 2, see FIG. 4) and the second bell crank 142. The second end 202 of the first implement spring 200 is fixed to the first rigid linkage 190 between the first end 191 and the second end 192 of the first rigid linkage 190. More particularly, the second end 202 of the first implement spring 200 is fixed to the first rigid linkage 190 towards the second end 192 of the first rigid linkage 190, adjacent to where the first linkage 190 and the second bell crank 142 are coupled. In some embodiments, the second end 202 of the first implement spring 200 is not directly coupled to the second bell crank 142. In various embodiments, the second end 202 of the first implement spring 200 is not directly coupled to a joint 193 that couples the second end 192 of the first linkage 190 and the second linkage arm 143 of the second bell crank 142. For example, where a bolt pivotably couples the first linkage 190 to the second linkage arm 143, the second end 202 of the first implement spring 200 is not directly coupled to the bolt. Such a configuration advantageously decreases the bending forces on the bolt to reduce the likelihood of mechanical failure.

The height selection tool 160 also has a second implement spring 210. The second implement spring 210 has a first end 211 fixed to the vehicle frame 124 and a second end 212 fixed to the second rigid linkage 195, which is best visible in FIG. 3. The second implement spring 210 exerts a linear force on the second linkage 195 that opposes the force on the linkage 190 by the weight of the implement 150 acting on the third bell crank 136 and the fourth bell crank 146. The second end 212 of the second implement spring 210 can be fixed to the second rigid linkage 195 consistently with the discussion above relevant to the first implement spring 200 and the first rigid linkage 190. In some embodiments, the second end 212 of the second implement spring 210 is not directly coupled to the fourth bell crank 146. In various embodiments, the second end 212 of the second implement spring 210 is not directly coupled to a joint 193 that couples the second end 197 of the second linkage 195 and the fourth linkage arm 148 of the fourth bell crank 146. For example, where a bolt pivotably couples the second linkage 195 to the fourth linkage arm 148, the second end 212 of the second implement spring 210 is not directly coupled to the bolt. Such a configuration advantageously decreases the bending forces on the bolt to reduce the likelihood of mechanical failure.

It should also be noted that, as used in this specification and the appended claims, the phrase "configured" describes a system, apparatus, or other structure that is constructed to perform a particular task or adopt a particular configuration. The word "configured" can be used interchangeably with similar words such as "arranged", "constructed", "manufactured", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference. In the event that any inconsistency exists between the disclosure of the present application and the disclosure(s) of any document incorporated herein by reference, the disclosure of the present application shall govern.

This application is intended to cover adaptations or variations of the present subject matter. It is to be understood that the above description is intended to be illustrative, and not restrictive, and the claims are not limited to the illustrative embodiments as set forth herein.

What is claimed is:
1. A grounds maintenance vehicle comprising:
a vehicle frame;
an implement coupled to the vehicle frame; and
a height selection tool configured to change a vertical position of the implement relative to the vehicle frame, the height selection tool comprising:

a manually engageable mechanism pivotably coupled to the vehicle frame, wherein pivoting of the manually engageable mechanism relative to the vehicle frame changes the vertical position of the implement relative to the vehicle frame, wherein the manually engageable mechanism defines a pivot pathway;

a locking rail coupled to the vehicle frame, wherein the locking rail extends adjacently to the pivot pathway, the locking rail defines a plurality of latch openings along the pivot pathway, each of the plurality of latch openings is a notch extending radially inward, and each latch opening comprises a leading face having a first profile and a trailing face having a second profile opposite the first profile, wherein at least one of the leading face and the trailing face is concave; and a pawl pivotably coupled to the manually engageable mechanism, wherein the pawl has a latching end configured to pivot into each latch opening to selectively fix the manually engageable mechanism to the locking rail at each of a plurality of incremental locations along the pivot pathway, wherein each incremental location corresponds to a particular latch opening and defines an operating height of the implement.

2. The grounds maintenance vehicle of claim 1, wherein each of the plurality of latch openings has a latch opening profile that is asymmetrical.

3. The grounds maintenance vehicle of claim 1, wherein the first profile and the second profile are different shapes.

4. The grounds maintenance vehicle of claim 1, further comprising a pawl release configured to selectively pivot the latching end of the pawl out of each latch opening, wherein a manually engageable control is coupled to the manually engageable mechanism in operative communication with the pawl release.

5. The grounds maintenance vehicle of claim 1, further comprising a transport lock configured to fix the manually engageable mechanism to the locking rail to define a transport height between the implement and a horizontal ground surface, wherein the transport height is greater than each operating height of the implement.

6. The grounds maintenance vehicle of claim 5, wherein the transport lock comprises the pawl and a first latch opening of the plurality of latch openings.

7. The grounds maintenance vehicle of claim 5, wherein the transport lock comprises a latch configured to releasably fix the manually engageable mechanism relative to the locking rail.

8. The grounds maintenance vehicle of claim 7, wherein the latch is pivotably coupled to the locking rail and defines a mechanism engagement surface, and the manually engageable mechanism defines a latch engagement surface that is configured to be engaged by the mechanism engagement surface of the latch.

9. The grounds maintenance vehicle of claim 8, further comprising a latch release configured to push the latch out of engagement with the latch engagement surface.

10. The grounds maintenance vehicle of claim 1, wherein the manually engageable mechanism and the locking rail directly contact the latching end of the pawl such that a load is transmitted from the manually engageable mechanism to the locking rail through the latching end of the pawl.

11. A grounds maintenance vehicle comprising:
a vehicle frame;
an implement coupled to the vehicle frame; and
a height selection tool configured to change a vertical position of the implement relative to the vehicle frame, the height selection tool comprising:

a manually engageable mechanism pivotably coupled to the vehicle frame, wherein pivoting of the manually engageable mechanism relative to the vehicle frame changes the vertical position of the implement relative to the vehicle frame, wherein the manually engageable mechanism defines a pivot pathway;

a locking rail coupled to the vehicle frame, wherein the locking rail defines a plurality of latch openings along the pivot pathway;

a first locking mechanism comprising a pawl pivotably coupled to the manually engageable mechanism, wherein the pawl has a latching end configured to pivot into each latch opening to selectively fix the manually engageable mechanism to the locking rail, wherein the first locking mechanism is configured to obstruct pivoting of the manually engageable mechanism in a first direction and a second direction at each of a plurality of incremental locations, wherein each incremental location corresponds to a particular latch opening and each incremental location defines a particular operating height of the implement from a horizontal ground surface; and a second locking mechanism configured to be engaged to selectively obstruct pivoting of the manually engageable mechanism relative to the locking rail at each of a plurality of height settings, wherein the second locking mechanism is configured to simultaneously (1) obstruct pivoting of the manually engageable mechanism in a first direction and (2) allow pivoting of the manually engageable mechanism in a second direction opposite the first direction.

12. The grounds maintenance vehicle of claim 11, further comprising a transport lock configured to fix the manually engageable mechanism relative to the locking rail to define a transport height between the implement and the horizontal ground surface, wherein the transport height is greater than each operating height of the implement.

13. The grounds maintenance vehicle of claim 11, wherein each of the plurality of latch openings is a notch extending radially inward.

14. The grounds maintenance vehicle of claim 11, wherein each of the latch openings has a profile that is asymmetrical.

15. The grounds maintenance vehicle of claim 11, wherein each of the plurality of latch openings have a leading face having a first profile and a trailing face having a second profile, wherein the first profile and the second profile are different shapes.

16. The grounds maintenance vehicle of claim 11, further comprising a pawl release configured to selectively pivot the latching end of the pawl out of each latch opening, wherein a manually engageable control is coupled to the manually engageable mechanism in operative communication with the pawl release.

17. The grounds maintenance vehicle of claim 12, wherein the transport lock comprises a latch configured to releasably fix the manually engageable mechanism relative to the locking rail.

18. The grounds maintenance vehicle of claim 17, wherein the latch is pivotably coupled to the locking rail and defines a mechanism engagement surface, and the manually engageable mechanism defines a latch engagement surface that is configured to be engaged by the mechanism engagement surface of the latch.

19. The grounds maintenance vehicle of claim 18, further comprising a latch release configured to push the latch out of engagement with the latch engagement surface.

20. The grounds maintenance vehicle of claim 11, wherein the second locking mechanism is configured to be selectively disengaged, wherein upon disengagement, the manually engageable mechanism and the locking rail directly contact the latching end of the pawl such that a load is transmitted from the manually engageable mechanism to the locking rail through the latching end of the pawl.

21. The grounds maintenance vehicle of claim 11, wherein when the second locking mechanism is engaged, a clearance is defined between the latching end of the pawl and the latch opening.

\* \* \* \* \*